(12) United States Patent
Lin et al.

(10) Patent No.: US 12,069,409 B2
(45) Date of Patent: Aug. 20, 2024

(54) IN-PERSON PARTICIPANT INTERACTION FOR HYBRID EVENT

(71) Applicant: Snap Inc., Santa Monica, CA (US)

(72) Inventors: Andrew Cheng-min Lin, Long Island City, NY (US); Walton Lin, Chatham, NJ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/899,921

(22) Filed: Aug. 31, 2022

(65) Prior Publication Data
US 2024/0073372 A1    Feb. 29, 2024

(51) Int. Cl.
*H04N 7/15* (2006.01)
*H04N 7/14* (2006.01)
*G06F 3/048* (2013.01)

(52) U.S. Cl.
CPC ............ *H04N 7/157* (2013.01); *H04N 7/147* (2013.01); *H04N 7/152* (2013.01)

(58) Field of Classification Search
CPC ........ H04N 7/157; H04N 7/147; H04N 7/152; G06F 3/017; G06F 3/04845; G06F 3/04883
See application file for complete search history.

(56) References Cited

U.S. PATENT DOCUMENTS

| | | | | |
|---|---|---|---|---|
| 6,002,853 A * | 12/1999 | de Hond | ............... | G06F 16/954 709/219 |
| 6,079,982 A * | 6/2000 | Meader | ................... | A63F 13/54 434/30 |
| 6,119,147 A * | 9/2000 | Toomey | ............... | G06Q 10/109 719/329 |
| 6,179,619 B1 * | 1/2001 | Tanaka | ..................... | A63G 7/00 472/60 |
| 6,219,045 B1 * | 4/2001 | Leahy | ..................... | H04L 67/10 709/204 |
| 6,362,817 B1 * | 3/2002 | Powers | ................... | G06T 17/00 345/428 |

(Continued)

FOREIGN PATENT DOCUMENTS

| | | |
|---|---|---|
| WO | 2022212386 | 10/2022 |
| WO | 2022212391 | 10/2022 |

*Primary Examiner* — Nicholas Augustine
(74) *Attorney, Agent, or Firm* — Schwegman Lundberg & Woessner, P.A.

(57) ABSTRACT

Aspects of the present disclosure involve a system comprising a computer-readable storage medium storing a program and method for in-person participant interaction for a hybrid event. The program and method provide an interface for designing a hybrid event between in-person and virtual participants, the interface for setting first properties of a physical space device present in a physical space, and setting second properties of a virtual room for the virtual participants; receive an indication of first user input setting the first and second properties; and in association with conferencing, configure the physical space device based on the first properties, display the virtual room based on the second properties, the virtual room including a live video feed of the physical space, receive, via a sidecar application accessible by the in-person participants, an indication of second user input for interacting with the physical space device, and provide for interaction based on the second user input.

18 Claims, 11 Drawing Sheets

(56) References Cited

U.S. PATENT DOCUMENTS

| | | | | |
|---|---|---|---|---|
| 6,396,522 B1* | 5/2002 | Vu | G06F 3/04845 | 715/848 |
| 6,414,679 B1* | 7/2002 | Miodonski | G06T 13/00 | 707/999.005 |
| 6,570,563 B1* | 5/2003 | Honda | A63F 13/352 | 345/473 |
| 6,573,903 B2* | 6/2003 | Gantt | G06F 30/00 | 345/619 |
| 6,784,901 B1* | 8/2004 | Harvey | H04L 67/02 | 715/848 |
| 6,961,055 B2* | 11/2005 | Doak | A63F 13/63 | 345/677 |
| 7,119,819 B1* | 10/2006 | Robertson | G06F 3/04815 | 715/848 |
| 7,414,629 B2* | 8/2008 | Santodomingo | G06T 17/05 | 345/582 |
| 7,542,040 B2* | 6/2009 | Templeman | G06T 13/40 | 345/474 |
| 7,663,625 B2* | 2/2010 | Chartier | G06T 19/20 | 700/182 |
| 7,746,343 B1* | 6/2010 | Charaniya | G06N 7/01 | 345/428 |
| 7,788,323 B2* | 8/2010 | Greenstein | G06Q 10/10 | 715/744 |
| 7,804,507 B2* | 9/2010 | Yang | H04N 13/344 | 345/633 |
| 7,814,429 B2* | 10/2010 | Buffet | G06F 30/00 | 715/763 |
| 7,817,150 B2* | 10/2010 | Reichard | G06T 15/20 | 715/705 |
| 7,844,724 B2* | 11/2010 | Van Wie | H04L 67/131 | 709/227 |
| 9,244,533 B2* | 1/2016 | Friend | G09B 21/009 | |
| 9,696,795 B2* | 7/2017 | Marcolina | G06T 17/10 | |
| 9,996,797 B1* | 6/2018 | Holz | G06F 3/04842 | |
| 10,516,853 B1* | 12/2019 | Gibson | H04N 7/157 | |
| 11,362,848 B1 | 6/2022 | Lin et al. | | |
| 11,381,411 B1 | 7/2022 | Gale et al. | | |
| 2001/0018667 A1* | 8/2001 | Kim | G06Q 30/0277 | 705/14.73 |
| 2002/0113820 A1* | 8/2002 | Robinson | G06F 16/954 | 715/764 |
| 2004/0113887 A1* | 6/2004 | Pair | G09B 25/08 | 345/156 |
| 2004/0193441 A1* | 9/2004 | Altieri | A63F 13/216 | 709/203 |
| 2005/0093719 A1* | 5/2005 | Okamoto | G01C 21/3697 | 705/14.62 |
| 2005/0128212 A1* | 6/2005 | Edecker | G06T 17/05 | 345/581 |
| 2008/0030429 A1* | 2/2008 | Hailpern | G06T 7/73 | 345/8 |
| 2008/0125218 A1* | 5/2008 | Collins | G06Q 90/00 | 463/31 |
| 2008/0246693 A1* | 10/2008 | Hailpern | G06T 7/246 | 345/8 |
| 2009/0076791 A1* | 3/2009 | Rhoades | A63F 13/53 | 703/21 |
| 2009/0091583 A1* | 4/2009 | McCoy | G06T 19/006 | 345/419 |
| 2009/0287728 A1* | 11/2009 | Martine | G06Q 30/02 | 715/810 |
| 2009/0300528 A1* | 12/2009 | Stambaugh | G06F 3/04817 | 715/764 |
| 2010/0070378 A1* | 3/2010 | Trotman | G06Q 30/02 | 705/26.1 |
| 2010/0115428 A1* | 5/2010 | Shuping | G06F 3/0481 | 715/277 |
| 2010/0205541 A1* | 8/2010 | Rapaport | G06Q 30/02 | 715/753 |
| 2010/0214284 A1* | 8/2010 | Rieffel | G06T 17/00 | 382/154 |
| 2010/0274567 A1* | 10/2010 | Carlson | G06Q 40/02 | 235/487 |
| 2010/0274627 A1* | 10/2010 | Carlson | G06Q 20/20 | 705/16 |
| 2011/0010636 A1* | 1/2011 | Hamilton, II | G06Q 10/10 | 705/26.7 |
| 2011/0041083 A1* | 2/2011 | Gabai | G06Q 10/00 | 715/753 |
| 2012/0249741 A1* | 10/2012 | Maciocci | G06T 19/006 | 348/51 |
| 2013/0042296 A1* | 2/2013 | Hastings | G06Q 50/184 | 726/1 |
| 2013/0174213 A1* | 7/2013 | Liu | G06F 21/6245 | 726/1 |
| 2014/0082526 A1* | 3/2014 | Park | H04L 65/403 | 715/757 |
| 2014/0282105 A1* | 9/2014 | Nordstrom | G06F 3/016 | 715/753 |
| 2017/0185261 A1* | 6/2017 | Perez | G06F 3/04845 | |
| 2017/0243403 A1* | 8/2017 | Daniels | G06F 3/1454 | |
| 2018/0129278 A1* | 5/2018 | Luchinskiy | G06F 3/0483 | |
| 2018/0131907 A1* | 5/2018 | Schmirler | H04N 23/698 | |
| 2018/0357472 A1* | 12/2018 | Dreessen | G06V 20/49 | |
| 2019/0087015 A1* | 3/2019 | Lam | A63F 13/213 | |
| 2020/0110928 A1* | 4/2020 | Al Jazaery | G05B 19/042 | |
| 2020/0117267 A1* | 4/2020 | Gibson | G06F 3/011 | |
| 2020/0117270 A1* | 4/2020 | Gibson | G06F 3/011 | |
| 2021/0008413 A1* | 1/2021 | Asikainen | G06F 3/0304 | |
| 2021/0041951 A1* | 2/2021 | Gibson | G06T 7/74 | |
| 2021/0165557 A1* | 6/2021 | Agarawala | G06F 3/167 | |
| 2022/0070232 A1* | 3/2022 | Young | G06T 19/003 | |
| 2022/0321369 A1 | 10/2022 | Lin et al. | | |
| 2022/0321371 A1 | 10/2022 | Lin et al. | | |
| 2022/0321372 A1 | 10/2022 | Cho et al. | | |
| 2022/0321373 A1 | 10/2022 | Lin et al. | | |
| 2022/0321374 A1 | 10/2022 | Lin et al. | | |
| 2022/0321375 A1 | 10/2022 | Lin et al. | | |
| 2022/0321376 A1 | 10/2022 | Lin et al. | | |
| 2022/0321613 A1 | 10/2022 | Lin et al. | | |
| 2022/0321617 A1 | 10/2022 | Gale et al. | | |
| 2022/0321832 A1 | 10/2022 | Lin et al. | | |
| 2022/0321833 A1 | 10/2022 | Lin et al. | | |
| 2022/0385490 A1 | 12/2022 | Lin et al. | | |
| 2022/0407735 A1 | 12/2022 | Gale et al. | | |
| 2023/0032922 A1 | 2/2023 | Lin et al. | | |
| 2023/0094963 A1 | 3/2023 | Lin et al. | | |
| 2023/0095314 A1 | 3/2023 | Lin et al. | | |
| 2023/0096597 A1 | 3/2023 | Lin et al. | | |
| 2023/0101377 A1 | 3/2023 | Lin et al. | | |
| 2023/0101879 A1 | 3/2023 | Lin et al. | | |
| 2024/0073371 A1 | 2/2024 | Lin et al. | | |

* cited by examiner

IN-PERSON PARTICIPANT INTERACTION FOR HYBRID EVENT

TECHNICAL FIELD

The present disclosure relates generally to virtual conferencing systems, including providing hybrid events using a virtual conferencing system.

BACKGROUND

A virtual conferencing system provides for the reception and transmission of audio and video data between devices, for communication between device users in real-time.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

A virtual conferencing system provides for the reception and transmission of audio and video data between devices, for communication between device users in real-time. A hybrid event provides for conferencing between in-person participants in a physical space and virtual participants. For example, the physical space includes devices (e.g., display device, speakers, microphones, cameras) for interaction with respect to the in-person participants and/or the virtual participants. The virtual participants may participate in the hybrid event via a virtual room displayed on respective devices of the virtual participants.

The disclosed embodiments provide for a virtual conferencing system configured for designing a hybrid event. For example, the virtual conferencing system allows a user (e.g., designer, administrator) to configure physical space devices for interaction with respect to the in-person participants and the virtual participants. In addition, the virtual conferencing system allows the designer to configure elements within the virtual room for interaction with respect to the in-person participants and the virtual participants. In this manner, the virtual participants may engage with the physical space (e.g., add messages to a chat interface presented on a display device, move a 360-degree camera) and the virtual room (e.g., interface elements configured to display messages and reactions). The in-person participants may also engage with the physical space (e.g., add messages to a chat interface presented on a display device) and the virtual room.

By virtue of allowing a user to configure a hybrid event in this manner, it is possible for the user to increase interaction with respect to in-person participants and virtual participants. In addition, allowing configuration of the physical space devices and virtual room as described herein provides for improved user engagement for the hybrid event. Without allowing the user (e.g., administrator) to configure a hybrid event in this manner, the user may otherwise be limited in configuring physical space devices and virtual rooms for conferencing between in-person and virtual participants. The disclosed embodiments facilitate creation of hybrid events, thereby saving time for the user, and reducing computational resources/processing power.

Figure 1:
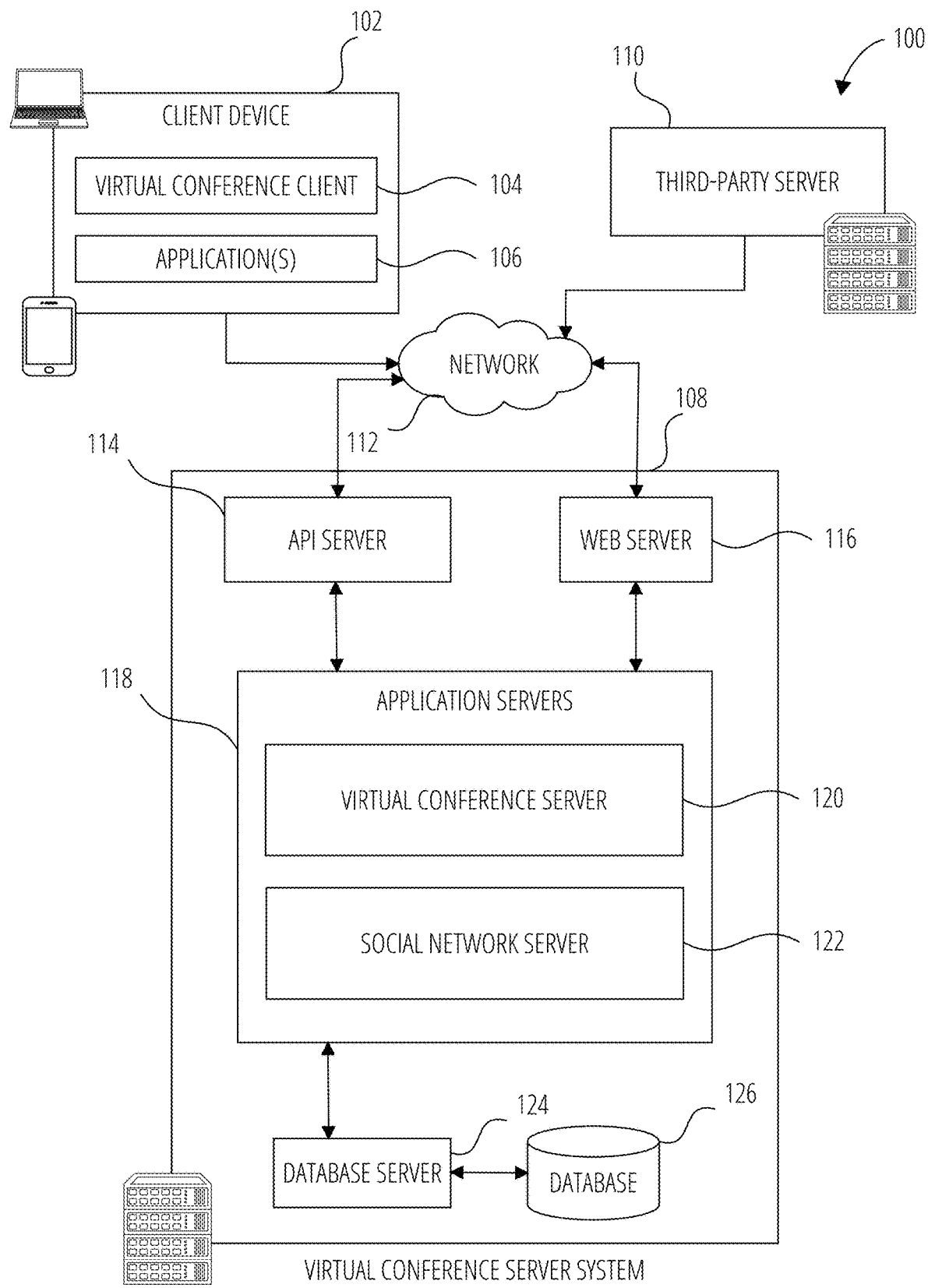
FIG. 1 is a diagrammatic representation of a networked environment in which the present disclosure may be deployed, in accordance with some examples.

FIG. 1 is a block diagram showing an example virtual conferencing system 100 for exchanging data over a network. The virtual conferencing system 100 includes multiple instances of a client device 102, each of which hosts a number of applications, including a virtual conference client 104 and other application(s) 106. Each virtual conference client 104 is communicatively coupled to other instances of the virtual conference client 104 (e.g., hosted on respective other client devices 102), a virtual conference server system 108 and third-party servers 110 via a network 112 (e.g., the Internet). A virtual conference client 104 can also communicate with locally-hosted applications 106 using Applications Program Interfaces (APIs).

The virtual conferencing system 100 provides for the reception and transmission of audio, video, image, text and/or other signals by user devices (e.g., at different locations), for communication between users in real-time. In some cases, two users may utilize virtual conferencing to communicate with each other in one-to-one communication at their respective devices. In other cases, multiway virtual conferencing may be utilized by more than two users to participate in a real-time, group conversation. Moreover, the virtual conferencing system 100 may provide for configuration of devices within the physical room to accommodate hybrid events. Thus, multiple client devices 102 may participate in virtual conferencing, for example, with the client devices 102 participating in a group conversation in which audio-video content streams and/or message content (e.g., text, images) are transmitted between the participant devices.

A virtual conference client 104 is able to communicate and exchange data with other virtual conference clients 104 and with the virtual conference server system 108 via the network 112. The data exchanged between virtual conference clients 104, and between a virtual conference client 104 and the virtual conference server system 108, includes functions (e.g., commands to invoke functions) as well as payload data (e.g., video, audio, other multimedia data, text).

The virtual conference server system 108 provides server-side functionality via the network 112 to a particular virtual conference client 104. For example, with respect to transmitting audio and/or video streams, the virtual conference client 104 (e.g., installed on a first client device 102) may facilitate in transmitting streaming content to the virtual conference server system 108 for subsequent receipt by other participant devices (e.g., one or more second client devices 102) running respective instances of the virtual conference client 104.

The streaming content can correspond to audio and/or video content captured by sensors (e.g., microphones, video cameras) on the client devices 102, for example, corresponding to real-time video and/or audio capture of the users (e.g., faces) and/or other sights and sounds captured by the respective device. The streaming content may be supplemented with other audio/visual data (e.g., animations, overlays, emoticons and the like) and/or message content (e.g., text, stickers, emojis, other image/video data), for example, in conjunction with extension applications and/or widgets associated with the virtual conference client 104.

While certain functions of the virtual conferencing system 100 are described herein as being performed by either a virtual conference client 104 or by the virtual conference server system 108, the location of certain functionality either within the virtual conference client 104 or the virtual conference server system 108 may be a design choice. For example, it may be technically preferable to initially deploy certain technology and functionality within the virtual conference server system 108 but to later migrate this technology and functionality to the virtual conference client 104 where a client device 102 has sufficient processing capacity.

The virtual conference server system 108 supports various services and operations that are provided to the virtual conference client 104. Such operations include transmitting data to, receiving data from, and processing data generated by the virtual conference client 104. This data may include the above-mentioned streaming content and/or message content, client device information, and social network information, as examples. Data exchanges within the virtual conferencing system 100 are invoked and controlled through functions available via user interfaces (UIs) of the virtual conference client 104.

Turning now specifically to the virtual conference server system 108, an Application Program Interface (API) server 114 is coupled to, and provides a programmatic interface to, application servers 118. The application servers 118 are communicatively coupled to a database server 124, which facilitates access to a database 126 that stores data associated with virtual conference content processed by the application servers 118. Similarly, a web server 116 is coupled to the application servers 118, and provides web-based interfaces to the application servers 118. To this end, the web server 116 processes incoming network requests over the Hypertext Transfer Protocol (HTTP) and several other related protocols.

The Application Program Interface (API) server 114 receives and transmits virtual conference data (e.g., commands, audio/video payloads) between the client device 102 and the application servers 118. Specifically, the Application Program Interface (API) server 114 provides a set of interfaces (e.g., routines and protocols) that can be called or queried by the virtual conference client 104 in order to invoke functionality of the application servers 118. The Application Program Interface (API) server 114 exposes various functions supported by the application servers 118, including account registration, login functionality, the streaming of audio and/or video content, and/or the sending and retrieval of message content, via the application servers 118, from a particular virtual conference client 104 to another virtual conference client 104, the retrieval of a list of contacts of a user of a client device 102, the addition and deletion of users (e.g., contacts) to a user graph (e.g., a social graph), and opening an application event (e.g., relating to the virtual conference client 104).

The application servers 118 host a number of server applications and subsystems, including for example a virtual conference server 120 and a social network server 122. The virtual conference server 120 implements a number of virtual conference processing technologies and functions, particularly related to the aggregation and other processing of content (e.g., streaming content) included in audio-video feeds received from multiple instances of the virtual conference client 104. Other processor and memory intensive processing of data may also be performed server-side by the virtual conference server 120, in view of the hardware requirements for such processing.

In one or more embodiments, the third-party server 110 provides for initiating communication between a user at the virtual conference client 104 of the client device 102 and a user external to the virtual conference server system 108. For example, the third-party server 110 may correspond to a cloud-based service which allows for programmatically making phone calls, receiving phone calls, sending text messages, receiving text messages and/or performing other communication functions using web service APIs.

Figure 3:
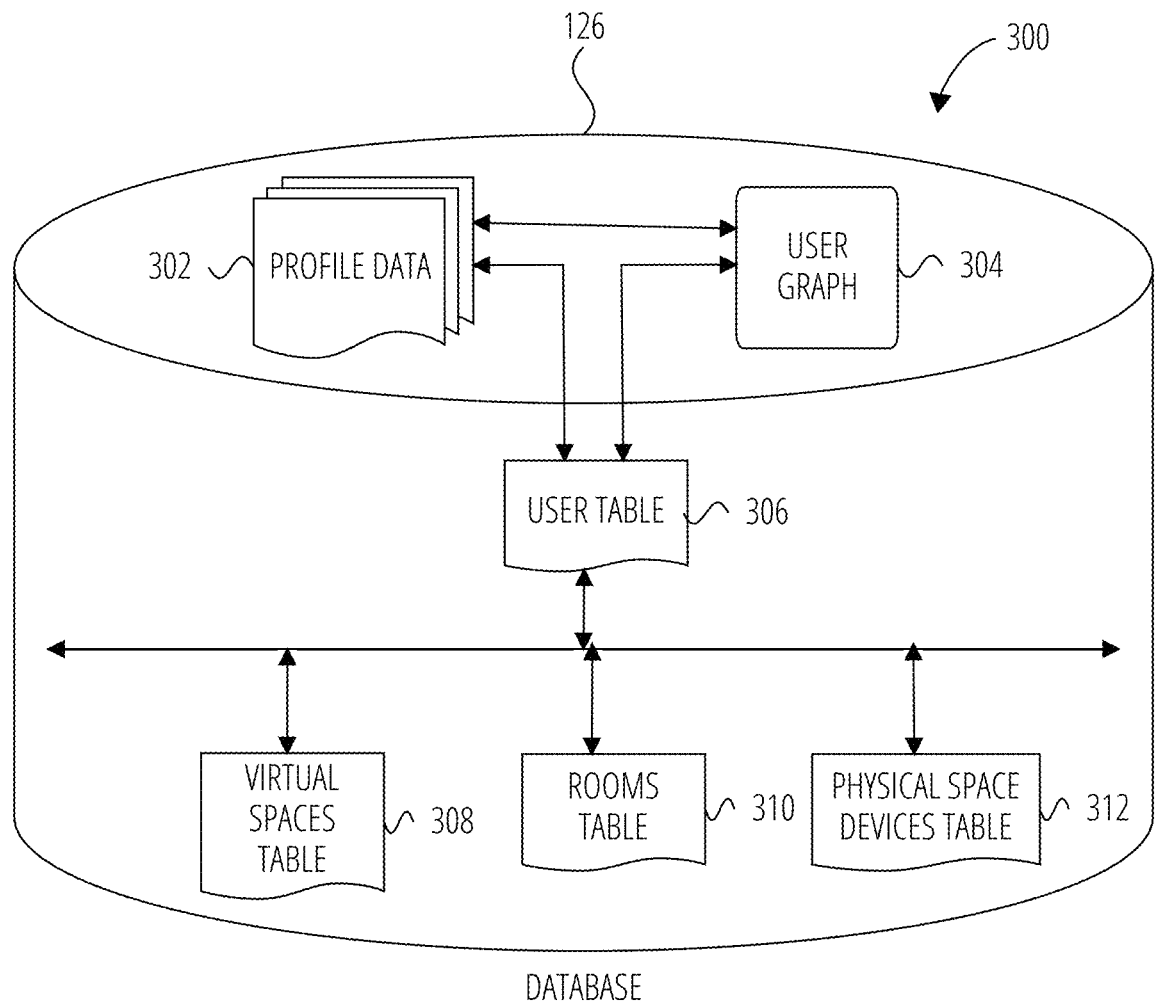
FIG. 3 is a diagrammatic representation of a data structure as maintained in a database, in accordance with some examples.

The social network server 122 supports various social networking functions and services and makes these functions and services available to the virtual conference server 120. To this end, the social network server 122 maintains and accesses a user graph 304 (as shown in FIG. 3) within the database 126. Examples of functions and services supported by the social network server 122 include the identification of other users of the virtual conferencing system 100 with which a particular user has relationships (e.g., contacts such as friends, colleagues, teachers, students, and the like).

In one or more embodiments, a user interacting via the virtual conference client 104 running on a first client device 102 may select and invite participant(s) to a virtual conference. For example, the participants may be selected from contacts maintained by the social network server 122. In another example, the participants may be selected from contacts included within a contact address book stored in association with the first client device 102 (e.g., in local memory or in a cloud-based user account). In another example, the participants may be selected by the user manually entering email addresses and/or phone numbers of the participants.

The user at the first client device 102 may initiate the virtual conference by selecting an appropriate user interface element provided by the virtual conference client 104, thereby prompting the invited participants, at their respective devices (e.g., one or more second client devices 102), to accept or decline participation in the virtual conference. When the participant(s) have accepted the invitation (e.g., via the prompt), the virtual conference server system 108 may perform an initialization procedure in which session information is published between the participant client devices 102, including the user who provided the invite. Each of the participant client devices 102 may provide respective session information to the virtual conference server system 108, which in turn publishes the session information to the other participant client devices 102. The session information for each client device 102 may include content stream(s) and/or message content that is made available by the client device 102, together with respective identifiers for the content stream(s) and/or message content.

As described below with respect to FIG. 2, the virtual conference may correspond to a virtual space which includes one or more rooms (e.g., virtual rooms). The virtual space and its corresponding rooms may have been created at least in part by the inviting user and/or by other users. In this manner, an end user may act as an administrator, who creates their own virtual spaces with rooms, and/or designs a virtual space based on preset available rooms.

Figure 2:
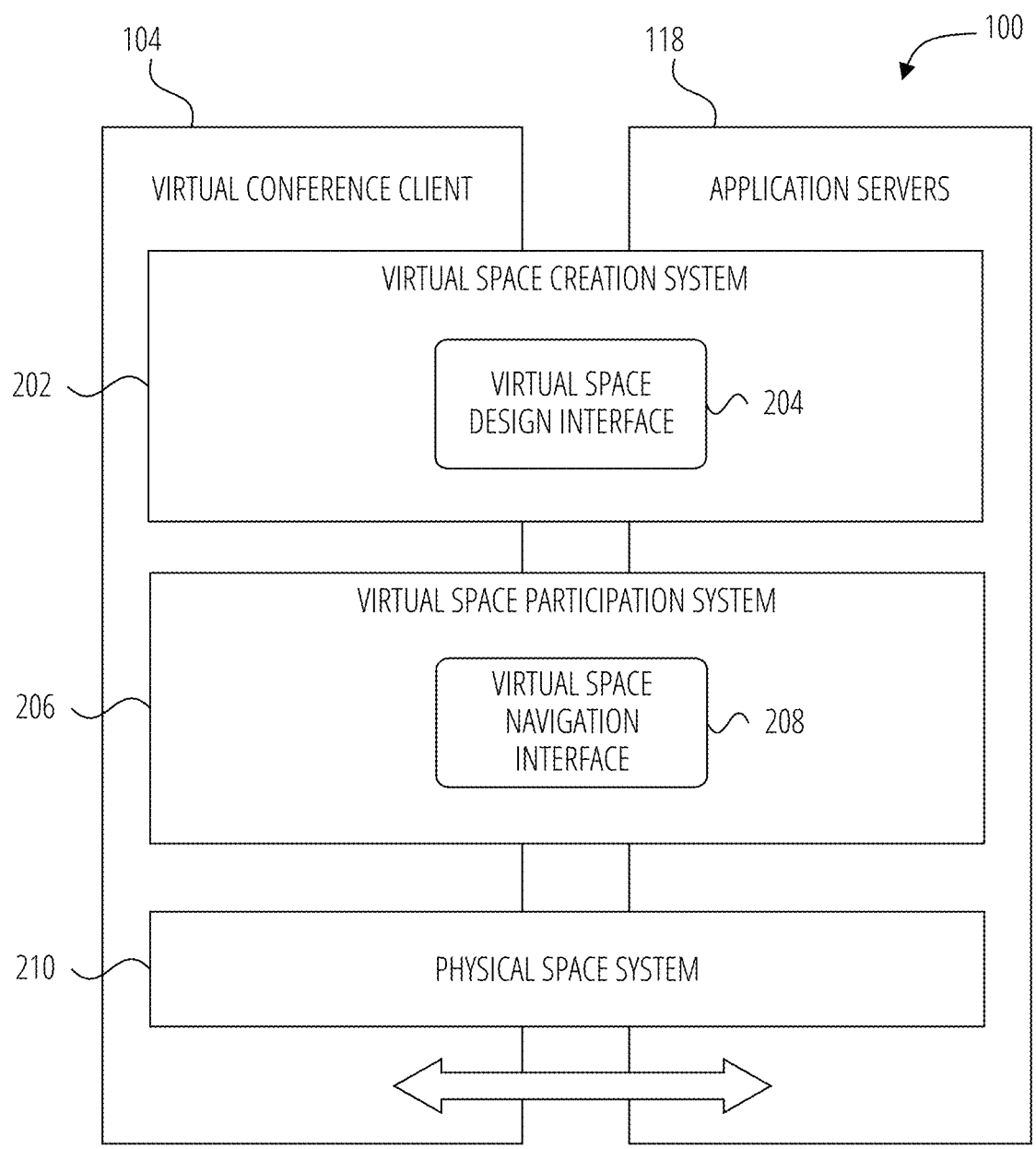
FIG. 2 is a diagrammatic representation of a virtual conferencing system, in accordance with some examples, that has both client-side and server-side functionality.

FIG. 2 is a block diagram illustrating further details regarding the virtual conferencing system 100, according to some examples. Specifically, the virtual conferencing system 100 is shown to comprise the virtual conference client 104 and the application servers 118. The virtual conferencing system 100 embodies a number of subsystems, which are supported on the client-side by the virtual conference client 104 and on the server-side by the application servers 118. These subsystems include, for example, a virtual space creation system 202 which implements a virtual space design interface 204, a virtual space participation system 206 which implements a virtual space navigation interface 208, and a physical space system 210.

The virtual space creation system 202 provides for a user to design one or more virtual space(s) in which participants may engage in virtual conferencing. In one or more embodiments, a virtual space corresponds to an environment with one or more rooms configured to accommodate virtual conferencing.

The virtual space may be created and/or selected (e.g., from among a set of predefined virtual spaces with rooms) by an end user who wishes to invite other users for virtual conferencing. In addition, the individual rooms of a virtual space may be newly-created and/or selected (e.g., from among a set of predefined rooms) by the end user. In one or more embodiments, the virtual space creation system 202 includes a virtual space design interface 204, which is usable by the end user to design a virtual space, including creating and/or selecting rooms for including in the virtual space.

As discussed below with respect to FIG. 4, the virtual space design interface 204 enables an end user (e.g., an administrator) to select and/or position multiple elements for including in a room. Examples of elements include, but are not limited to, participant video elements (e.g., for displaying the respective video feeds of participants), chat interfaces (e.g., for participants to provide text-based messages, stickers and/or reactions within a room), breakout buttons (e.g., for shuffling from a first room to one or more second rooms), and/or other user-definable elements for performing certain actions (e.g., speaking into a virtual microphone, querying an administrator via a button, and the like).

The virtual space participation system 206 is configured to perform virtual conferencing among participants within a virtual space. The participants may include the end user (e.g., administrator) who created the virtual space, as well as those users who were invited to participate in virtual conferencing with respect to the virtual space created/selected by the end user. The virtual space participation system 206 includes a virtual space navigation interface 208 (e.g., discussed below with respect to FIG. 5) that allows participants to navigate between the rooms of a virtual space, and to participate in virtual conferencing with respect to the rooms.

The physical space system 210 enables the end user to configure devices within a physical space occupied by in-person participants of a hybrid event. Examples of such physical devices include, but are not limited to, display devices (e.g., monitors, projectors), address (PA) system components (e.g., microphones, amplifiers and loudspeakers), and cameras (e.g., webcams, conference cameras, 360-degree cameras). The physical space system 210 facilitates the input and output of content for the physical space devices during a hybrid event, to allow conferencing between the in-person participants and the virtual participants.

In one or more embodiments, the virtual space creation system 202, the virtual space participation system 206, and the physical space system 210 provide for an end user (e.g., an administrator) to create different types of environments (e.g., virtual spaces with rooms, hybrid events) for virtual conferencing, and for participants to engage in virtual conferencing within such environments. Examples of such virtual conferencing include, but are not limited to: business meetings, seminars, presentations, classroom lectures, teacher office hours, concerts, reunions, virtual dinners, escape rooms, and the like.

FIG. 3 is a schematic diagram illustrating data structures 300, which may be stored in the database 126 of the virtual conference server system 108, according to certain examples. While the content of the database 126 is shown to comprise a number of tables, it will be appreciated that the data could be stored in other types of data structures (e.g., as an object-oriented database).

The database 126 includes profile data 302, a user graph 304 and a user table 306 relating to the users (participants) of the virtual conferencing system 100. The user table 306 stores user data, and is linked (e.g., referentially) to the user graph 304 and the profile data 302. Each user of the virtual conferencing system 100 is associated with a unique identifier (email address, telephone number, social network identifier, etc.).

The user graph 304 stores (e.g., in conjunction with the social network server 122) information regarding relationships and associations between users. Such relationships may be social, professional (e.g., work at a common corporation or organization) interested-based or activity-based, merely for example. As noted above, the user graph 304 may be maintained and accessed at least in part by the social network server 122.

The profile data 302 stores multiple types of profile data about a particular user. The profile data 302 may be selectively used and presented to other users of the virtual conferencing system 100, based on privacy settings specified by a particular user. The profile data 302 includes, for example, a user name, telephone number, email address, and/or settings (e.g., notification and privacy settings), as well as a user-selected avatar representation.

The database 126 further includes a virtual spaces table 308. As noted above, a virtual space corresponds to an environment with one or more rooms configured to accommodate virtual conferencing. A virtual space may be newly-created by a user, or may be included within one or more sets of public virtual spaces made available (e.g., by other users, system administrators, and the like) for virtual conferencing. The virtual spaces table 308 stores information representing the one or more sets of public virtual spaces, as well as any private virtual space(s) created by a user (e.g., in a case where the particular user did not make such virtual space(s) public).

In one or more embodiments, the virtual spaces table 308 stores associations between its virtual spaces and users (e.g., within the user table 306) who selected those virtual spaces. In this manner, it is possible for a particular user to have one or more virtual spaces associated therewith.

In addition, the database 126 includes a rooms table 310 which may be associated with the virtual spaces within the virtual spaces table 308. As noted above, a room may be newly-created by a user, or may be included within one or more sets (e.g., galleries) of public rooms made available for user selection. The rooms table 310 stores information representing the one or more sets of rooms, as well as any private room(s) created by the user (e.g., in a case where the particular user did not make such room(s) public). The stored information is usable by the virtual conferencing system 100 to create the corresponding rooms for use in a virtual space. In one or more embodiments, the stored information may further include recordings (e.g., audio and/or video recordings) of a particular virtual conference, for subsequent playback by corresponding participants.

Moreover, the database 126 includes a physical space devices table 312 which may be associated with the virtual spaces within the virtual spaces table 308 and/or one or more virtual rooms within the rooms table 310. The physical space devices table 312 stores information for physical space devices within the physical space corresponding to a hybrid event. Such information includes, but is not limited to, the type of content, format of content, resolution, layout, input and output levels, links to content (e.g., URLs), and the like. In this manner, the physical devices may be configured for conferencing between in-person and virtual participants for a hybrid event.

Figure 4:
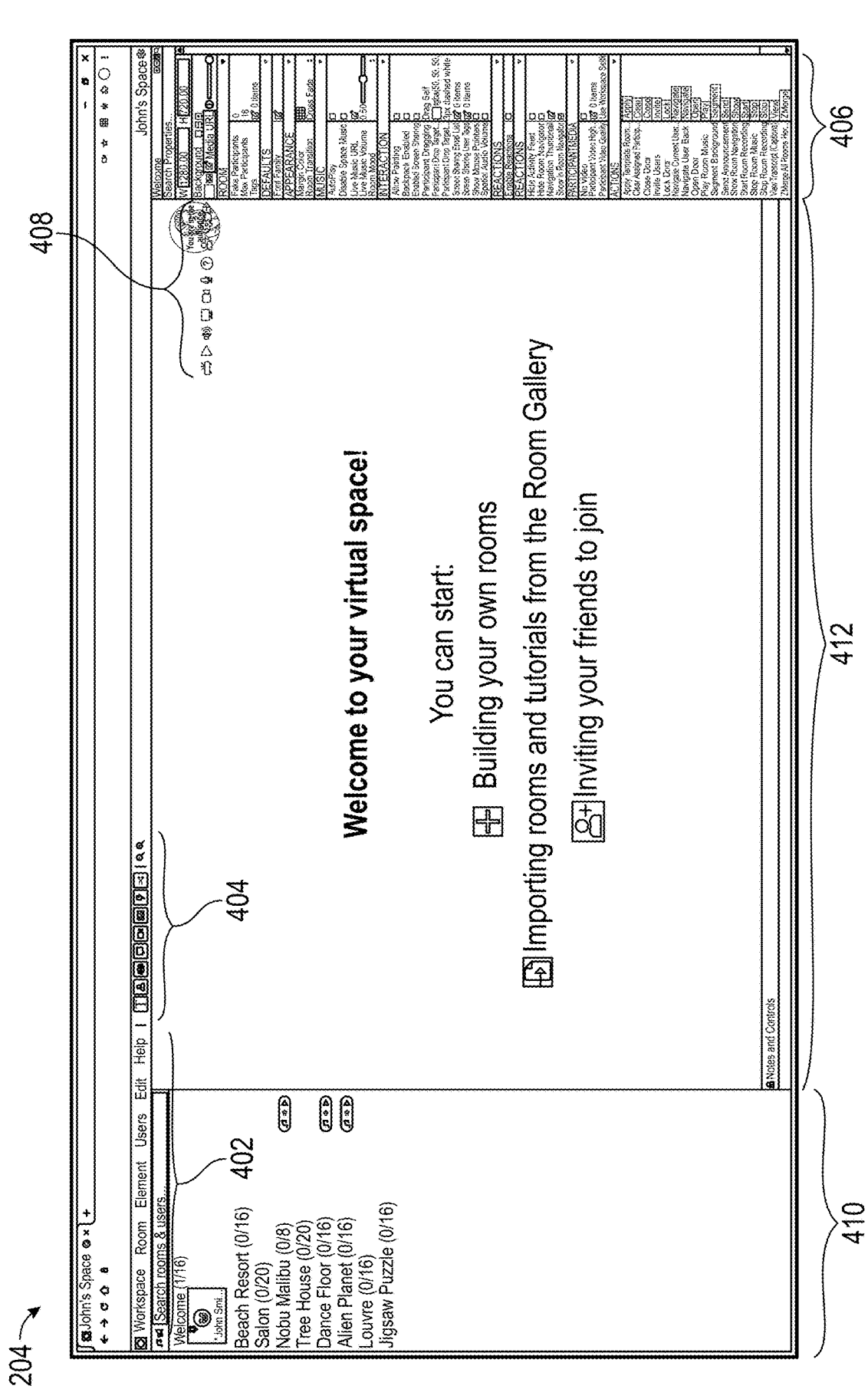
FIG. 4 illustrates a virtual space design interface with interface elements for designing a virtual space, in accordance with some example embodiments.

FIG. 4 illustrates a virtual space design interface 204 with interface elements for designing a virtual space, in accordance with some example embodiments. Designing the virtual space may include creation and/or selection of rooms for including in the virtual space. The virtual space design interface 204 includes a menu interface 402, a room elements interface 404, an element properties interface 406, a controls interface 408, a room list interface 410, a room canvas interface 412, and an administrator name 414. It is noted that elements 402-414 correspond to an example of interface elements for the virtual space design interface 204, and that additional, fewer and/or different interface elements may be used.

An administrator (e.g., corresponding to administrator name 414) may use the various interface elements to design a virtual space. In one or more embodiments, the menu interface 402 includes user-selectable categories (e.g., menu headings) relating to a virtual space (e.g., "workspace"), rooms within the virtual space, and/or elements within a room. For example, the workspace category is user-selectable for presenting options (e.g., via a drop-down list) to manage settings for the virtual space, manage invites for the virtual space, manage versions of a virtual space, publish the virtual space (e.g., for future use by users), manage virtual space publications, and/or to start/manage recordings (e.g., audio and/or video recordings) with respect to the virtual space.

The room category of the menu interface 402 is user-selectable for presenting options (e.g., via a drop-down list) to manage settings for a room within the virtual space, set a room background, set an order for the rooms listed in the room list interface 410, create a new room, import a room from a set of available rooms, remove a room, publish a room, manage room publications, and/or to start/manage recordings with respect to a room.

In addition, the element category is user-selectable for presenting options (e.g., via a drop-down list) to insert elements into a room, insert shapes into a room, foreground/background elements, arrange/position elements, and/or group elements. Examples of elements include, but are not limited to: an action button, analog clock, audience question board, backpack item, breakout button, camera (e.g., a 360-degree camera element), chat, closed caption display, closed caption input, countdown, clock, digital clock, external communication element (e.g., a doorbell), double-sided image, feedback, image, multiuser video chat, music, participant audio mixer, participant count, participant video element (e.g., single or multiple), picture strip, poll, random source, room preview, scheduled time, sound effect, stopwatch, take picture, text, timer, user search, video, waiting list, web media, website. Examples of shapes include, but are not limited to, a circle, rectangle and triangle.

The users category of the menu interface 402 is user-selectable for presenting options (e.g., via a drop-down list) to manage users/participants of the virtual space (e.g., adding tags for participants, so as to distinguish between roles such as an administrator or an attendee/participant). In addition, the edit category is user-selectable for performing edit operations (e.g., undo, redo, cut, copy, paste), and the help category is user-selectable for performing help operations (e.g., getting started, discord, live help, submitting feedback).

In one or more embodiments, the room elements interface 404 includes user-selectable icons for inserting elements (e.g., corresponding to a subset of those available via the above-mentioned element category) into a current room. For example, the elements may be added and/or positioned within the current room by selecting the element and dragging the selected element onto the room canvas interface 412, which represents the layout of the current room.

In one or more embodiments, the room elements interface 404 includes icons including but not limited to: a text icon for adding text to a room; a participant video icon for adding a single participant video element (e.g., an interface element which is selectable by a single participant for displaying that participant's video feed) to a room; a multiuser video icon for adding a multiple participant video element (e.g., an interface element which is selectable by one or more participants for displaying the video feeds for those participants) to a room; a chat icon for adding a chat interface (e.g., for messaging using text, stickers, emojis, etc.) to a room; a video playback icon for adding a video playback element (e.g., screen) to a room for playback of a selected video; a background icon for selecting a background color/gradient, image or video to a room; an action icon for adding an action element (e.g., button) to a room for performing a user-defined action (e.g., speaking into a virtual microphone, querying an administrator via a button, and the like); and/or a breakout button for adding a breakout element (e.g., button) for shuffling selected participants between the current room and one or more other rooms.

In one or more embodiments, the element properties interface 406 include various fields for setting configuration properties for above-described room elements. For example, with respect to elements in general (e.g., text, single participant video element, multi participant video element, chat interface, video element, background image, action element, breakout button), the element properties interface 406 includes fields for setting the element title/name, opacity, color/gradient, style, layout, borders/corners, shadows, interaction (e.g., to what extent participant(s) may delete, modify, resize the element), filtering, full screen status, conditions, accessibility and actions for the element.

For a participant video element, the element properties interface 406 includes further fields for setting the manner in which users are placed into the participant video element during virtual conferencing (e.g., automatically, manually by the participant and/or the administrator end user). In addition, for the chat interface, the element properties interface 406 includes further properties for setting who (e.g., administrator and/or participants) can provide chat input, and/or which types of input (e.g., text, stickers, emoj is, etc.) are available. For the action element, the element properties interface 406 includes further properties for setting what type of action is to be performed in response to user selection of the action element (e.g., button). Moreover, for the breakout element, the element properties interface 406 includes further properties for selecting participants and/or breakout rooms.

In one or more embodiments, the element properties interface 406 further includes fields for setting configuration properties for the room canvas interface 412. For example, the element properties interface 406 includes fields for selecting a number of fake participants (e.g., simulated video feeds) in order to visualize multiple users, selecting music (e.g., background music), and/or selecting reaction buttons for participants to indicate real-time reactions with respect to virtual conferencing within a room.

In one or more embodiments, the controls interface 408 includes user-selectable icons corresponding to controls (e.g., administrative controls) for the virtual space. For example, the controls interface 408 include icons including but not limited to: a director mode icon for toggling between a director mode for designing a room and a user mode for viewing the room within the virtual space design interface 204 (e.g., with the director mode including the room elements interface 404 and the element properties interface 406 while the user mode does not); a view icon for viewing the room within the virtual space navigation interface 208; a share screen icon (e.g., for collaborative design with other user(s) such as co-administrators); a microphone icon for enabling or disabling the microphone; a help icon (e.g., getting started, discord, live help, submitting feedback); an invite icon (e.g., for displaying an invite link for sending to participants to visit the virtual space); a settings icon (e.g., for selecting the end user's video and audio devices for the virtual conferencing, and for selecting a user avatar); and/or an exit icon for exiting the virtual space design interface 204.

In one or more embodiments, the room list interface 410 displays the list of rooms for the virtual space. Each listed room is user selectable to switch to edit (e.g., in director mode) and/or view (e.g., in user mode) the selected room. As noted above, the list of rooms may be modified (e.g., by adding, importing and/or removing rooms) via the options within the room category of the menu interface 402.

Figure 5:
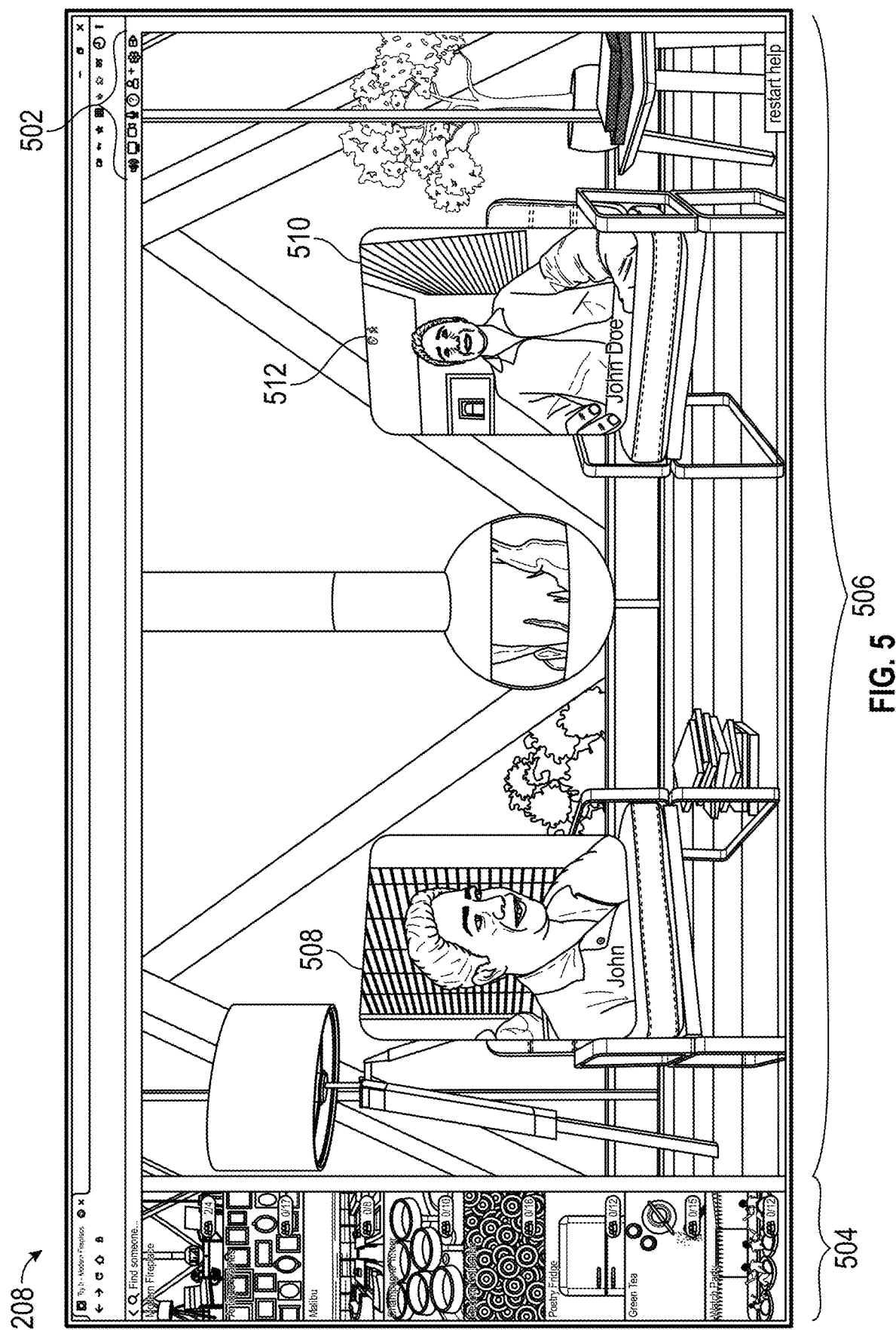
FIG. 5 illustrates a virtual space navigation interface with interface elements to navigate between the rooms of a virtual space and to participate in virtual conferencing with respect to the rooms, in accordance with some example embodiments.

FIG. 5 illustrates a virtual space navigation interface 208 with interface elements to navigate between the rooms of a virtual space and to participate in virtual conferencing with respect to the rooms, in accordance with some example embodiments. The virtual space navigation interface 208 includes a controls interface 502, a room list interface 504, a virtual space participation system 206, a participant video element 508 and a participant video element 510. It is noted that elements 502-512 correspond to an example of interface elements for the virtual space navigation interface 208, and that additional, fewer and/or different interface elements may be used.

In one or more embodiments, the controls interface 502 includes user-selectable icons corresponding to controls (e.g., administrative controls) for the virtual space. For example, the controls interface 408 include icons including but not limited to: an edit icon for redirecting to the virtual space design interface 204 to edit the current room; a volume icon for adjusting a volume level for the current room; a share screen icon (e.g., for allowing others to view the room without necessarily joining the room); a microphone icon for muting and unmuting the microphone; a help icon (e.g., getting started, discord, live help, submitting feedback); an invite icon (e.g., for displaying an invite link for participants to visit the virtual space); a settings icon (e.g., for selecting the end user's video and audio devices for the virtual conferencing, and for selecting a user avatar); and/or an exit icon for exiting the virtual space design interface 204.

In one or more embodiments, the room list interface 504 displays the list of rooms for the virtual space. Each listed room is user selectable to switch to the selected room (e.g., for virtual conferencing). The selected room is presented as a current room within the virtual space participation system 206. In this manner, a participant may navigate among the multiple rooms available within the virtual space. Alternatively or in addition, navigation between rooms is possible via a virtual space map interface (not shown) which depicts a map view of the virtual space (e.g., a floor plan) and its corresponding rooms, with each room being user selectable to navigate thereto. Alternatively or in addition, navigation between rooms is further possible by positioning a navigation button (not shown) within a room, where user selection of the button results in navigating to another room (e.g., a predefined room). As noted above, the virtual space design interface 204 allows for the design of a virtual space and its corresponding rooms. As such, navigation between rooms is based at least in part on the design of the virtual space (e.g., a virtual space may include one or more of the above-mentioned room list interface 504, the virtual space map/floor plan interface and/or the navigation button).

With respect to the virtual space participation system 206, each participant is represented as a respective participant video element. As noted above, a participant video element corresponds to an interface element (e.g., a box) which is selectable by a single participant for displaying that participant's video feed. The example of FIG. 5 includes a first participant associated with the participant video element 508 and a second participant associated with the participant video element 510. In one or more embodiments, with respect to the perspective of the first participant, the participant video element 510 showing the feed of the second participant may include participant button(s) 512. For example, the participant button(s) 512 are selectable by the first participant so as to perform a predefined action (e.g., initiate a side conversation, designate the second participant to follow the first participant when the first participant moves rooms) with respect to the second participant.

While the example of FIG. 5 illustrates two participants, it is possible for the virtual space participation system 206 to accommodate additional participants for virtual conferencing. The additional participants may be positioned (e.g., automatically and/or manually by dragging) based on the positioning of participant video elements (e.g., boxes) as designed by the virtual space design interface 204.

In one or more embodiments, the virtual space navigation interface 208 may vary based on whether a given participant is an administrator or another participant (e.g., an attendee). For example, some participant video elements may be designated (e.g., via the virtual space design interface 204) for administrators, while other participant video elements are designated for other participants. The virtual conference server system 108 is configured to distinguish between these administrator or other participant roles, for example, based on the above-described tags assigned to participants via the users category of the menu interface 402 provided by the virtual space design interface 204.

Figure 6:
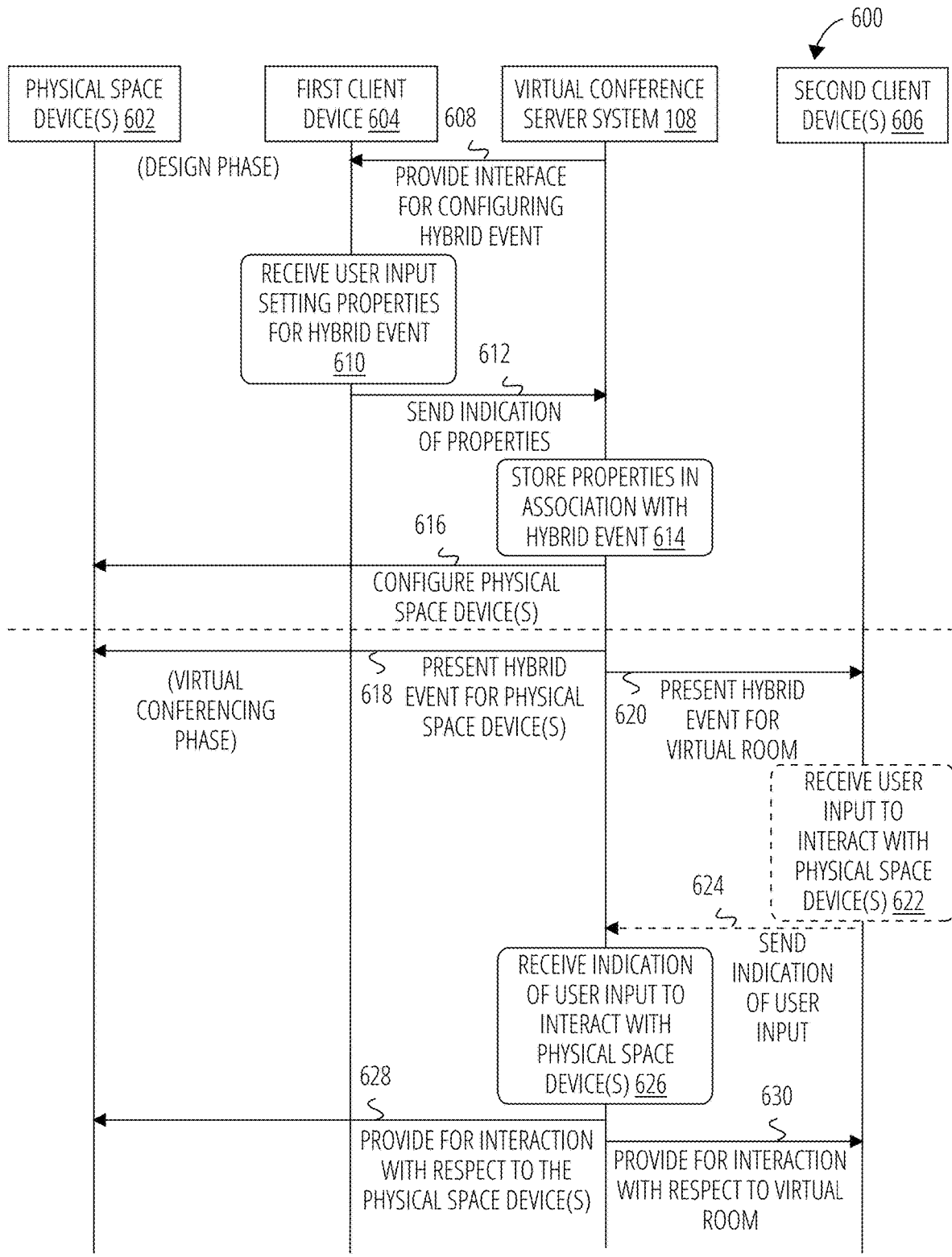
FIG. 6 is an interaction diagram illustrating a process for providing hybrid events using a virtual conferencing system, in accordance with some example embodiments.

FIG. 6 is an interaction diagram illustrating a process 600 for providing hybrid events using a virtual conferencing system, in accordance with some example embodiments. For explanatory purposes, the process 600 is described herein with reference to one or more physical space device(s) 602, a first client device 604, one or more second client device(s) 606, and the virtual conference server system 108. Each of the first client device 604 and the second client device(s) 606 may correspond to a respective client device 102. Each of the physical space device(s) 602 are within a physical space accommodating in-person participants of a hybrid event. The process 600 is not limited to the physical space device(s) 602, the first client device 604, the second client device(s) 606 and the virtual conference server system 108. Moreover, one or more blocks (or operations) of the process 600 may be performed by one or more other components of the physical space device(s) 602, first client device 604, second client device(s) 606 or the virtual conference server system 108, and/or by other suitable devices. Further for explanatory purposes, the blocks (or operations) of the process 600 are described herein as occurring in serial, or linearly. However, multiple blocks (or operations) of the process 600 may occur in parallel or concurrently. In addition, the blocks (or operations) of the process 600 need not be performed in the order shown and/or one or more blocks (or operations) of the process 600 need not be performed and/or can be replaced by other operations. The process 600 may be terminated when its operations are completed. In addition, the process 600 may correspond to a method, a procedure, an algorithm, etc.

Each of the first client device 604 and the second client device(s) 606 have instances of the virtual conference client 104 installed thereon. In the example of FIG. 6, the first client device 604 and the second client device(s) 606 are associated with a respective first participant (e.g., an administrator or designer) and respective one or more second participant(s) (or "virtual participants") of the virtual conference server system 108. For example, the first participant may be associated with a first user account of the virtual conference server system 108, and the second participant(s) may be associated with second user account(s) of the virtual conference server system 108.

As noted above, the first participant and second participant(s) are identifiable by the virtual conference server system 108 based on unique identifiers (e.g., email addresses, telephone numbers) associated with respective user accounts for the first participant and second participant(s). In one or more embodiments, the virtual conference server system 108 implements and/or works in conjunction with a social network server 122 which is configured to identify contacts with which a particular user has relationships. For example, the first participant and second participant(s) may be contacts with respect to the virtual conference server system 108.

As described herein, the virtual conferencing system 100 provides for a designer/administrator (e.g., the first participant) to design a virtual space corresponding to a hybrid event. As noted above, a hybrid event provides for conferencing between in-person participants within a physical space and virtual participants (e.g., the second participants). The physical space includes physical space device(s) 602 (e.g., displays, speakers, microphones, cameras) for interaction with respect to the in-person participants and/or the virtual participants. Moreover, the virtual participants may participate in the hybrid event via a virtual room presented by the virtual conference clients 104 running on respective devices (e.g., the second client device(s) 606) of the virtual participants.

In the example of FIG. 6, operations 608-616 correspond to a first phase (e.g., a "design phase") and operations 618-630 correspond to a second phase (e.g., a "virtual conferencing phase") for the hybrid event. During the design phase, the first participant (e.g., administrator) designs the hybrid event, by setting properties (e.g., sizes, shapes, positions, effects) for the physical space device(s) 602 and for the elements of the virtual room. During the virtual conferencing phase, the physical space device(s) 602 and the virtual room are presented based on their respective properties. It may be understood that the second phase may occur shortly after the first phase, or after an extended period of time after the first phase. As such, FIG. 6 includes a dashed line separating the first phase and the second phase for illustrative purposes.

At operation 608, the virtual conference server system 108 provides an interface (e.g., a user interface) to the first client device 604. The interface is for configuring a hybrid event, for conferencing between in-person participants and virtual participants. In the example of FIG. 6, the first client device 604 is associated with the first participant, who may design the room and/or act as a presenter during the hybrid event. However, it is not necessary that the designer of the room be a presenter and/or participant of the hybrid event.

In one or more embodiments, the interface for configuring the hybrid event corresponds to the virtual space design interface 204, which includes the element properties interface 406. The element properties interface 406 includes various fields for setting configuration properties for the physical space device(s) 602 present in a physical space of the in-person participants. By way of non-limiting example, the physical space device(s) 602 may include one or more of: display devices such as monitors, projectors, and the like; public address (PA) system components such as microphones, amplifiers, loudspeakers, and the like; and/or cameras such as webcams, conference cameras, 360-degree camera and the like.

For physical space device(s) 602 corresponding to display devices, the element properties interface 406 in conjunction with the virtual space design interface 204 provides for configuring the content, layout and/or resolution for each display device. Regarding content, a given display device may be configured to display elements such as: image/video captured by a camera in the physical space (e.g., a video of a presenter); slide deck content (e.g., which is controllable by the presenter); chat messages, question board content and/or reactions as provided by in-person and/or virtual participants; and/or video participant elements corresponding to video feeds of the virtual participants. For each element to be displayed on a display device, the virtual space design interface 204 provides for the first participant to specify one or more of the: position, shape, size, title/name, opacity, gradient, style, layout, borders/corners, shadows, interaction (e.g., to what extent participant(s) may delete, modify, resize the element), filtering, full screen status, conditions, accessibility, and/or segmenting (e.g., with respect to other interface elements/background objects).

In addition, the element properties interface 406 includes fields for setting the manner in which virtual participants are to be displayed for each of the display device(s). For example, the element properties interface 406 allows the designer to specify a number of participant video elements (e.g., none, one, or multiple) to be displayed on the display device. A participant video element may be configured to display the video feeds for one or more of: specific virtual participant(s), virtual participant(s) who are currently speaking (e.g., based on audio output levels at their respective second client device(s) 606). In another example, a participant video element may be configured to automatically rotate through the live video feeds of the second client device(s) 606, such that the in-person participants (e.g., the first participant and/or the second participant(s)) can view a rotation of the virtual participants during the hybrid event.

By virtue of providing interfaces to configure the display device(s) in this manner, the in-person participants are able to view multiple aspects associated with the hybrid event. For example, the in-person participants may look to the display device(s) to view slide deck content, comments and reactions from in-person participants and/or virtual participants, live video of the presenter, and live video of the virtual participants.

For physical space device(s) 602 corresponding to PA devices (e.g., microphones, amplifiers, loudspeakers), the element properties interface 406 in conjunction with the virtual space design interface 204 provides for configuring the input/output settings for each PA device. For example, the element properties interface 406 allows the first participant to set input and/or output levels with respect to the PA devices in the physical space. For a microphone, the element properties interface 406 provides for the first participant to set a link (e.g., a URL) for accessing the audio captured by the microphone.

In this manner, audio provided by in-person participants (e.g., in-person participant speech/applause, in-person participant reactions via a sidebar application as discussed further below) can be observed by the virtual participants. In addition, audio provided by the virtual participants (e.g., virtual participant speech/applause, virtual participant reactions via the virtual conference client 104 as discussed further below) can be observed by the in-person participants.

For physical space device(s) 602 corresponding to cameras (e.g., including 360-degree camera(s)), the element properties interface 406 in conjunction with the virtual space design interface 204 provides for configuring the camera to capture image data (e.g., live video) in the physical space. For example, the virtual space design interface 204 allows the first participant to set the position, resolution and the like, for image data captured by each camera. The element properties interface 406 provides for the first participant to set a link (e.g., URL) for accessing the image data (e.g., live video) captured by each camera. In this manner, video captured within the physical room (e.g., a live video feed of the presenter, other in-person participants, an exhibit, and the like) can be observed by the in-person participants within the physical room and/or by the virtual participants.

In addition to configuring the physical space device(s) 602 present in the physical space, the virtual space design interface 204 provides for configuring a virtual room for the hybrid event. As noted above, a virtual room allows virtual participants (e.g., the second participant(s)) to participate in the hybrid event. The element properties interface 406 of the virtual space design interface 204 includes various fields for setting configuration properties for the virtual room.

The element properties interface 406 provides for including and configuring elements for the virtual room, for example, to present content corresponding to the physical space. As noted above, the room may be configured to include one or more of the following elements: an action button, analog clock, audience question board, backpack item, breakout button, camera element (e.g., including a 360-degree camera element), chat, closed caption display, closed caption input, countdown, clock, digital clock, doorbell, double-sided image, feedback, image, multiuser video chat, music, participant audio mixer, participant count, participant video element (e.g., single or multiple), picture strip, poll, random source, room preview, scheduled time, sound effect, stopwatch, take picture, text, timer, user search, video, waiting list, web media, website, or a shape (e.g., circle, rectangle, triangle).

As discussed below with respect to FIG. 7, a camera element is configured to be assignable to a respective camera in the physical space (e.g., a camera that is accessible via a link such as a URL, as noted above). In one or more embodiments, the camera element is a 360-degree camera element for accessing a 360-degree camera in the physical space. For example, the 360-degree camera corresponds to an omnidirectional camera or a collection of cameras for capturing live video in every direction at the same time. In this manner, the virtual participants can view the speaker and/or other parts of the physical space in real-time.

In addition, the virtual room may be designed to output the audio of microphone(s) within the physical space, such that the virtual participants can hear real-time audio from the physical room. Moreover, the virtual room may include: a reactions interface, such that the virtual participants can provide reactions to the in-person participants via the physical space device(s) 602 as discussed above; a chat interface, such that the virtual participants can provide messages to the in-person participants via the physical space device(s) 602; and/or a question board interface, such that the virtual participants can submit questions to the in-person participants (e.g., the speaker) via the physical space device(s) 602.

As noted above, the element properties interface 406 in conjunction with the virtual space design interface 204 provides for configuring the positions, shapes and/or sizes for each of the elements in the virtual room. The element properties interface 406 includes fields for setting one or more of the title/name, opacity, gradient, style, layout, borders/corners, shadows, interaction (e.g., to what extent participant(s) may delete, modify, resize the element), filtering, full screen status, conditions, accessibility and actions. Moreover, the virtual space design interface 204 provides for a designer of a room to create a room background (e.g., with seating objects), to position/place room elements anywhere within a room (e.g., relative to background objects), and/or to segment objects (e.g., background objects) depicted in the room for displaying room elements relative to one another.

Thus, the virtual conference client 104 running on the first client device 604 provides for display of the virtual space design interface 204. The virtual space design interface 204 allows the first participant to configure the physical space device(s) 602 of the physical space occupied by the in-person participants, and to configure the virtual room for presenting to the virtual participants via their respective second client device(s) 606. The element properties interface 406 of the virtual space design interface 204 includes various fields for setting configuration properties of the physical space device(s) 602 and of the elements within the virtual room.

At block 610, the first client device 604 receives user input for setting properties for the hybrid event. The first client device 604 sends an indication of the properties for the hybrid event to the virtual conference server system 108 (operation 612). For example, values input by the user at the first client device 604, for the various fields associated with configuring the physical space device(s) 602 and the virtual room, are sent from the first client device 604 to the virtual conference server system 108.

The virtual conference server system 108 stores the properties for configuring the physical space device(s) 602 and the virtual room in association with the hybrid event (block 614). For example, the virtual conference server system 108 provides for storing the physical space device(s) 602 in the physical space devices table 312 of the database 126. The virtual conference server system 108 also provides for storing the virtual room properties (e.g., user-selected values for the various fields) within the rooms table 310 of the database 126, in association with the virtual room corresponding to the hybrid event.

At operation 616, the virtual conference server system 108 causes the physical space device(s) 602 to be configured based on their corresponding properties as set by the user at block 610. For example, the virtual conference server system 108 accesses respective properties as stored in the database 126 per operation 612 to configure any display devices, PA devices, cameras and/or any other physical space device(s) 602 in the physical space, based on their stored configurations. In this manner, the physical space device(s) 602 are properly configured for the hybrid event.

As noted above, operations 618-630 relate to a virtual conferencing phase, in which in-person participants and virtual participants engage in the hybrid event via the physical room and the virtual room. For example, the in-person participants within the physical space can observe a live presenter within the physical space. Video captured by cameras may be displayed on display devices within the physical space for viewing by the in-person participants, and audio captured by microphones may be output by speakers within the physical space for listening to by the in-person participants. Video and audio captured within the physical space can also be sent to the virtual conference server system 108 for presenting within the virtual room viewable by virtual participants at their respective second client device(s) 606.

In addition, the virtual participants can use their respective second client device(s) 606 to contribute content such as chat messages, video (e.g., a live feed), virtual reactions or other interactions, which are output to the physical space device(s) 602 (e.g., the display devices, speakers) in the physical space. Individual virtual participants can further control cameras (e.g., a 360-degree camera) via the virtual room, so as to view different perspectives of the physical space. Moreover, the in-person participants can access a sidebar application via their own client devices (e.g., mobile devices), in order to contribute content to chat interfaces, question boards, and the like, for viewing by other in-person participants and/or by the virtual participants.

At operation 618, the virtual conference server system 108 provides for presenting the hybrid event based on the stored properties for the physical space device(s) 602. For example, with respect to each display device in the physical room, the virtual conference server system 108 provides for display output based on the above-described properties (e.g., content, layout, resolution, and the like) stored in the physical space devices table 312 of the database 126. As noted above, display devices may be configured to display the live video feeds from the second client device(s) 606, for example, so that in-person participants can view a rotating, live feed of the virtual participants.

With respect to each PA device, the virtual conference server system 108 provides for input/output based on the above-described properties (e.g., input/output levels, links to audio captured by microphone, and the like) stored in the physical space devices table 312. With respect to each camera in the physical room, the virtual conference server system 108 provides for capturing image data based on the above-described properties (e.g., positions, resolution, links to captured video, and the like) stored in the database 126. With respect to any other physical space device(s) 602, the virtual conference server system 108 provides for input and output for such devices based on their respective properties stored in the database 126.

At operation 620, the virtual conference server system 108 provides for presenting the hybrid event based on the stored properties for the virtual room. As noted above with respect to FIG. 5, the virtual room may be presented within the virtual space navigation interface 208 for navigating between rooms. Each room element (e.g., camera element, microphone, reactions interface, chat interface, question board interface, other room elements) is presented based on the above-described properties (e.g., positions, shapes, sizes, effects, interaction, accessibility, and the like) stored in the database 126.

In this regard, the virtual conference server system 108 provides for the virtual participants and/or the in-person participants to interact with (e.g., submit content for output on) the physical space device(s) 602 and the virtual room. In FIG. 6, block 622 corresponds to an example scenario (e.g., depicted in dashed lines) in which a virtual participant provides input to interact with the physical space device(s) 602. For example, the virtual room (e.g., the virtual space participation system 206 within the virtual space navigation interface 208) may include user-selectable options for viewing and/or contributing content (e.g., text, image data) to a chat interface, question board interface, reactions interface, and the like.

In another example, block 622 may correspond to a scenario in which a virtual participant at one of the second client device(s) 606 selects to control a camera (e.g., a 360-degree camera) within the physical space. As noted above, the virtual room may be configured with a 360-degree camera element which links (e.g., via a specified URL) to the 360-degree camera. In this manner, the virtual participant(s) may observe the live feed from the 360-degree degree camera, and/or change the perspective view with respect to the 360-degree camera.

In one or more embodiments, the 360-degree video element may have been configured (e.g., during design) to be movable or otherwise controllable by select one(s) of the virtual participant(s) during virtual conferencing. In this regard, the 360-degree video element may include interface elements (e.g., controls) for moving/controlling the video feed. Examples of such movement include, but are not limited to, panning, zooming, pausing, resuming playback, rewinding, fast-forwarding and/or skipping (e.g., a predefined time or section back or forward). At operation 624, an indication of the user input received at block 622 is sent by the respective second client device(s) 606 to the virtual conference server system 108.

Thus, following operation 624, the virtual conference server system 108 receives indication of the user input to interact with the physical space device(s) 602 (block 626). As noted above, operations 622-624 correspond to an example scenario in which the virtual participant provides user input to interact with the virtual room and the physical space device(s) 602, and in which the virtual conference server system 108 receives an indication of such user input. Alternatively or in addition, it is possible for in-person participants to interact with the physical space device(s) 602 and the virtual room.

In one or more embodiments, the virtual conferencing system 100 provides for a sidecar application configured to interact with the hybrid event. As described herein, the sidecar application is a companion application for accessing services provided by the virtual conference server system 108 of the virtual conferencing system 100. By way of non-limiting example, such services correspond to interfaces for viewing, contributing to (e.g., adding content to), and/or otherwise interacting with one or more of the above-mentioned reactions interface, the chat interface, the question board interface, and the like. In this manner, the in-person participants may interact with the physical space device(s) 602 in the physical space and/or in the virtual room. The interactions may correspond to displaying content (e.g., text) and/or outputting audio (e.g., predefined sounds) corresponding to the respective reactions, chats, questions, and the like.

In one or more embodiments, the sidecar application may correspond to a link (e.g., URL) configured to access the above-mentioned interfaces. The sidecar application may be accessible to the in-person participants via a QR code displayed within the physical space. For example, the QR code may be printed on a display board, pamphlet, or the like within the physical space, and/or displayed on one of the display devices within the physical space. The QR code may direct to a link (e.g., URL) corresponding to the sidecar application.

Thus, the user input received at block 626 may be received from an in-person participant or a virtual participant. At operation 628, the virtual conference server system 108 provides for interaction with respect to the physical space device(s) 602 (e.g., by displaying the user-inputted text, images, reactions on the display devices, by outputting any corresponding audio via the speakers and/or by effecting camera movement). Moreover, at operation 630, the virtual conference server system 108 provides for interaction with respect to the virtual rom (e.g., by displaying the user-inputted within room elements, by outputting any corresponding audio via room elements, and/or displaying the image feed of the moving camera via its respective room element).

While the example of FIG. 6 is described with respect to a single virtual room and a single physical space, it is understood that the virtual conferencing system 100 provides for the room designer (e.g., the first participant) to configure a hybrid event with multiple physical spaces and/or multiple virtual rooms. For example, the virtual space may be designed such that different virtual rooms are associated with different physical spaces, different parts of physical spaces, or a combination thereof.

Thus, the virtual conferencing system 100 as described herein allows the a user (e.g., the first participant) to design a virtual space corresponding to a hybrid event. The hybrid event provides for conferencing between in-person participants within a physical space and virtual participants in a virtual room. The virtual conferencing system 100 allows the designer to configure physical space devices (e.g., display devices, PA devices, cameras) for interaction with respect to the in-person participants and/or the virtual participants. The virtual conferencing system 100 further allows the designer to configure elements within the virtual room for interaction with respect to the in-person participants and the virtual participants. In this manner, the virtual participants may engage with the physical space (e.g., add messages to a display board, move a 360-degree camera) and with the virtual room (e.g., via room elements configured to display messages and reactions). Moreover, the in-person participants may engage with the physical space (e.g., add messages and reactions to a display board via a sidecar application) and the virtual room.

By virtue of allowing a user to configure a hybrid event in this manner, it is possible for to have increased interaction with respect to in-person participants and virtual participants. In addition, the configuration of the physical space devices and virtual room may be more engaging for the participants of the hybrid event. Without allowing the user (e.g., administrator) to configure a hybrid event in this manner, the user may otherwise be limited in configuring devices and virtual rooms for conferencing between in-person and virtual participants. The virtual conferencing system 100 facilitates creation of hybrid events, thereby saving time for the user, and reducing computational resources/processing power for the virtual conferencing system 100.

Figure 7:
FIG. 7 illustrates a current room interface corresponding to a virtual room of a hybrid conference, in accordance with some example embodiments.

FIG. 7 illustrates a current room interface 506 corresponding to a virtual room of a hybrid conference, in accordance with some example embodiments. As noted above, the virtual room is viewable by the second participant(s) at their respective second client device(s) 606, and provides for the virtual participant(s) to interact with the physical space of the hybrid event. As noted above, the current room interface 506 corresponding to such a virtual room may be included within a virtual space navigation interface 208 (e.g., per FIG. 5). The example of FIG. 7 depicts a display interface 702, a slides button 704, a standard camera button 706, a 360-degree camera button 708, a reactions interface 710, a breakout button 714 and a chat interface 712.

In one or more embodiments, the current room interface 506 allows a virtual participant to switch between viewing slide content, standard camera content and 360-degree camera content associated with the physical space of the hybrid event. For example, in response to user selection of the slides button 704, the display interface 702 is updated to display predesignated slide content (e.g., a slideshow). The slide content may be accessible via a specified link (e.g., URL) based on configurations specified during the above-described design phase. The display interface 702 may also be updated to include slide show control elements for navigating through the slide show.

In response to user selection of the standard camera button 706, the display interface 702 is updated to display image data (e.g., live video) captured by a standard camera in the physical space. The image data may be accessible via a specified link based on configurations specified during the design phase. For example, the standard camera may correspond to a fixed position camera directed to a presenter in the physical space.

In response to user selection of the 360-degree camera button 708, the display interface 702 is updated to display image data (e.g., live video) captured by a 360-degree camera in the physical space. The captured image data may be accessible via a specified link based on configurations specified during the design phase. The display interface 702 may also be updated to include slide show control elements for controlling the 360-degree camera.

The reactions interface 710 includes different buttons to indicate respective reactions. By way of non-limiting example, reactions buttons may include a heart button, laugh button, sleep button, thumbs up button, high five button, applause button, praying button, and respective reactions may include love/happiness, laughing, sleep/boredom, agreement, congratulations, applause, and praising. In response to user input selecting a button within the reactions interface 710, the second client device(s) 606 sends an indication of the selections to the virtual conference server system 108, for displaying on configured physical space device(s) 602 and/or within the virtual room (e.g., current room interface 506) as discussed above. In one or more embodiments, selections of a particular button within the reactions interface 710 causes the virtual conference server system 108 to display respective instances of a respective icon (e.g., within the current room interface 506) for the second client device(s) 606 and the physical space device(s) 602 configured to display reactions. Each reaction icon may be displayed as an animation that begins at a bottom edge of the current room interface 506, travels/floats upwards for a predefined distance from the bottom edge, and disappears after traveling the predefined distance.

The chat interface 712 includes interface elements for the virtual participants to add message content (e.g., text, image data) to a message thread. As noted above, the chat interface is viewable by each of the virtual participants at their respective second client device(s) 606, and is further viewable by the in-person participants via the configured physical space device(s) 602 (e.g., display devices) within the physical space.

The breakout button 714 is user-selectable by a virtual participant to engage in a breakout session with other virtual participants of the hybrid event. As noted above, a breakout session allows for virtual participants to shuffle from a first room (e.g., the current room interface 506) to one or more second rooms within the virtual space corresponding to the hybrid event. In one or more embodiments, the virtual conference server system 108 provides for the in-person participants to participate in the breakout session using the physical space device(s) 602.

Figure 8:
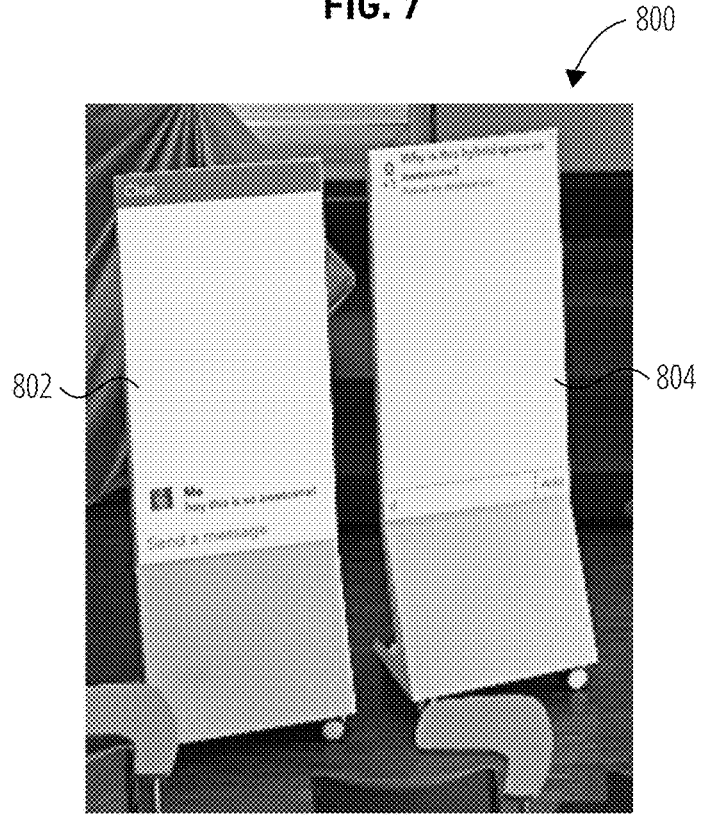
FIG. 8 illustrates example display devices provided within a physical space, for viewing by in-person participants of a hybrid event, in accordance with some example embodiments.

FIG. 8 illustrates example display devices 802-804 provided within a physical space 800, for viewing by in-person participants of a hybrid event, in accordance with some example embodiments. In the example of FIG. 8, the display device 802 is configured (e.g., during the design phase) to display a chat interface in the physical space. On the other hand, the display device 804 is configured (e.g., during the design phase) to display a question board interface in the physical space.

As noted above, each of the display devices 802-804 is configured for interaction with respect to the in-person participants and the virtual participants. For example, the in-person participants can directly view the display devices 802-804 within the physical space, and can add content (e.g., messages, questions, images, reactions) to the display devices 802-804 via a sidecar application running on their respective devices. Alternatively or in addition, the virtual participants can add content (e.g., messages, questions, images, reactions) to the display devices 802-804 via the virtual conference client 104 running on their respective second client device(s) 606.

Figure 9C:
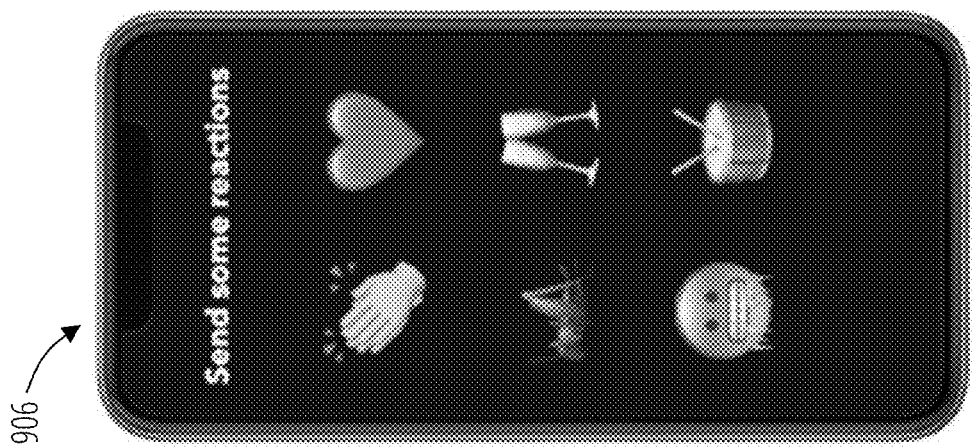
FIGS. 9A-9C illustrate example sidecar application interfaces accessible by in-person participants of a hybrid event, in accordance with some example embodiments.
Figure 9B:
Figure 9A:

FIGS. 9A-9C illustrate example sidecar application interfaces 902-906 accessible by in-person participants of a hybrid event, in accordance with some example embodiments. As noted above, a sidebar application may correspond to a link (e.g., URL) which is accessible via a QR code displayed within the physical space. The sidecar application may be preconfigured to present each of the sidecar application chat interface 902, the sidecar application question board interface 904 and the sidecar application reactions interface 906 based on a predefined schedule or agenda for the hybrid event.

Using the sidecar application via their respective client devices, the in-person participants may contribute content to the sidecar application chat interface 902, the sidecar application question board interface 904 and/or the sidecar application reactions interface 906. The content may be displayed within the respective one of the sidecar application interfaces 902-906 (e.g., for viewing by in-person participants) and/or within corresponding interface elements of the virtual room (e.g., for viewing by virtual participants).

Figure 10:
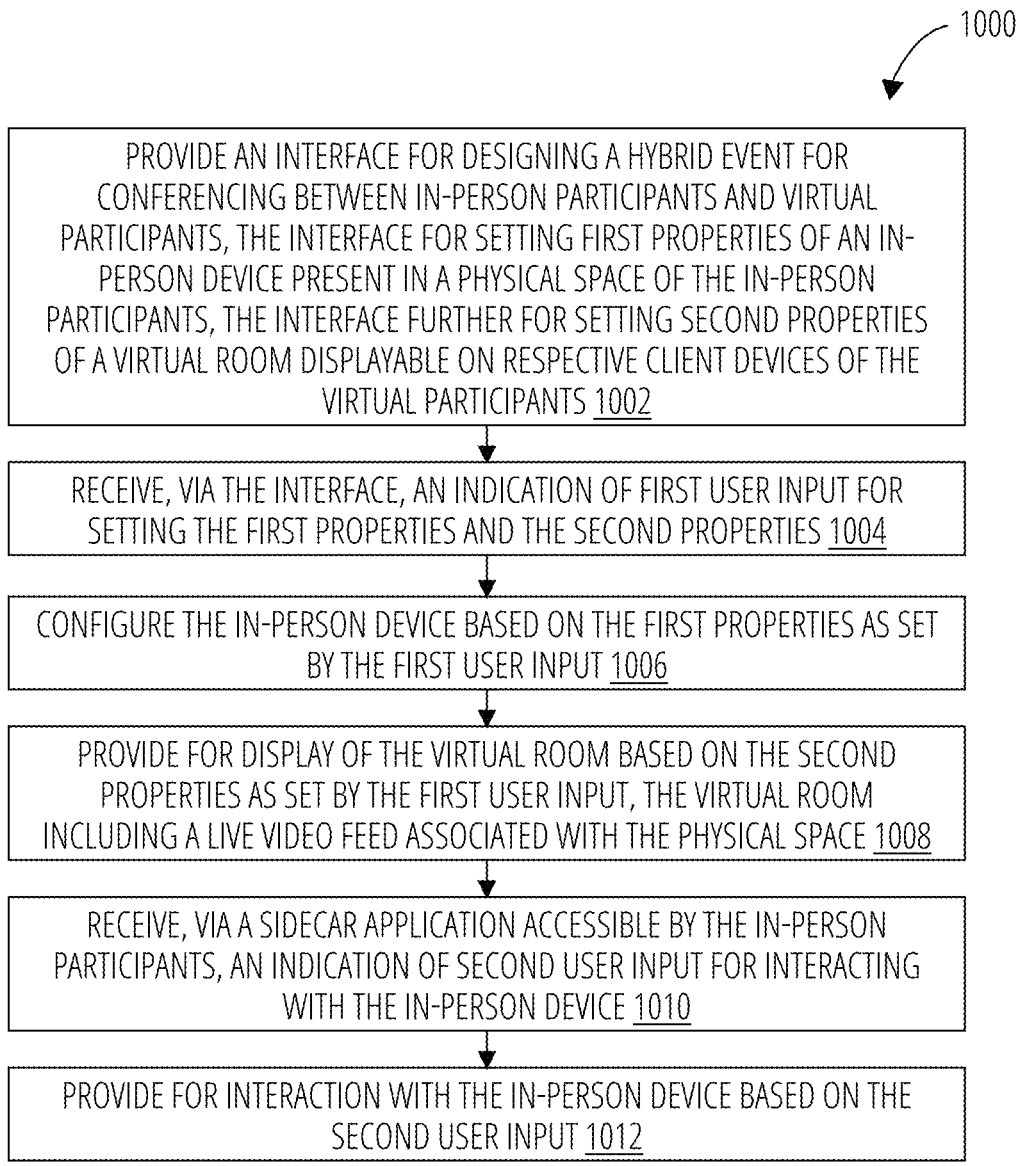
FIG. 10 is a flowchart illustrating a process for providing hybrid events using a virtual conferencing system, in accordance with some example embodiments.

FIG. 10 is a flowchart illustrating a process 1000 for providing hybrid events using a virtual conferencing system, in accordance with some example embodiments. For explanatory purposes, the process 1000 is primarily described herein with reference to the virtual conference server system 108, physical space device(s) 602, first client device 604 and second client device(s) 606 of FIG. 1 and FIG. 2. However, one or more blocks (or operations) of the process 1000 may be performed by one or more other components, and/or by other suitable devices. Further for explanatory purposes, the blocks (or operations) of the process 1000 are described herein as occurring in serial, or linearly. However, multiple blocks (or operations) of the process 1000 may occur in parallel or concurrently. In addition, the blocks (or operations) of the process 1000 need not be performed in the order shown and/or one or more blocks (or operations) of the process 1000 need not be performed and/or can be replaced by other operations. The process 1000 may be terminated when its operations are completed. In addition, the process 1000 may correspond to a method, a procedure, an algorithm, etc.

The virtual conference server system 108 provides an interface for designing a hybrid event for conferencing between in-person participants and virtual participants, the interface for setting first properties of a physical space device (e.g., the physical space device(s) 602) present in a physical space of the in-person participants, the interface further for setting second properties of a virtual room displayable on respective client devices (e.g., the second client device(s) 606) of the virtual participants (block 1002). The virtual conference server system 108 receives, via the interface, an indication of first user input for setting the first properties and the second properties (block 1004).

The virtual conference server system 108 configures, in association with conferencing for the hybrid event, the physical space device based on the first properties as set by the first user input (1006). The virtual conference server system 108 provides for display of the virtual room based on the second properties as set by the first user input, the virtual room including a live video feed associated with the physical space (block 1008). The virtual conference server system 108 receives, via a sidecar application accessible by the in-person participants, an indication of second user input for interacting with the physical space device (block 1010).

The first user input may be provided by a designer of the hybrid event, and the second user input may be received from at least one client device of the in-person participants, the at least one client device running the sidecar application. The sidecar application may be accessible to the in-person participants via a QR code displayed within the physical space.

For example, the physical space device is a display device, and the second user input corresponds to user-submitted text for presenting on the display and on the respective client devices of the virtual participants. In another example, the physical space device is a display device, and the second user input corresponds to a user-submitted reaction for presenting on the display and on the respective client devices of the virtual participants. In another example, the physical space device is a speaker, and the second user input corresponds to a user-submitted reaction with an audio component for outputting via the speaker and via the respective client devices of the virtual participants.

The virtual conference server system 108 provides for interaction with the physical space device based on the second user input (block 1012). The virtual conference server system 108 may provide, within the physical space, for a display that rotates through live video feeds captured by the respective client devices.

Figure 11:
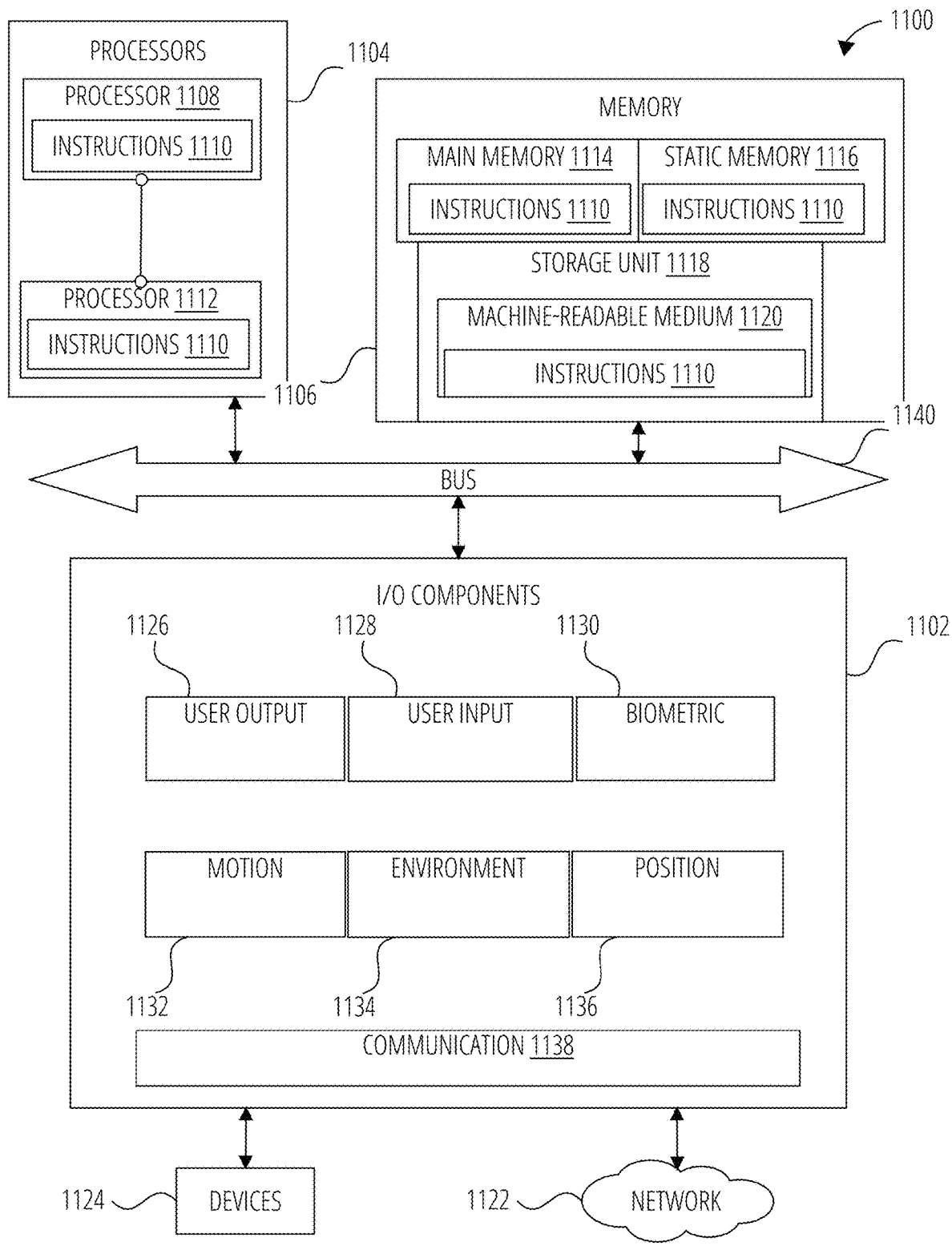
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1110 (e.g., software, a program, an application, an applet, an app, or other executable code) for causing the machine 1100 to perform any one or more of the methodologies discussed herein may be executed. For example, the instructions 1110 may cause the machine 1100 to execute any one or more of the methods described herein. The instructions 1110 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines that individually or jointly execute the instructions 1110 to perform any one or more of the methodologies discussed herein. The machine 1100, for example, may comprise the client device 102 or any one of a number of server devices forming part of the virtual conference server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1102, which may be configured to communicate with each other via a bus 1140. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1108 and a processor 1112 that execute the instructions 1110. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1114, a static memory 1116, and a storage unit 1118, both accessible to the processors 1104 via the bus 1140. The main memory 1106, the static memory 1116, and storage unit 1118 store the instructions 1110 embodying any one or more of the methodologies or functions described herein. The instructions 1110 may also reside, completely or partially, within the main memory 1114, within the static memory 1116, within machine-readable medium 1120 within the storage unit 1118, within at least one of the processors 1104 (e.g., within the Processor's cache memory), or any suitable combination thereof, during execution thereof by the machine 1100.

The I/O components 1102 may include a wide variety of components to receive input, provide output, produce output, transmit information, exchange information, capture measurements, and so on. The specific I/O components 1102 that are included in a particular machine will depend on the type of machine. For example, portable machines such as mobile phones may include a touch input device or other such input mechanisms, while a headless server machine will likely not include such a touch input device. It will be appreciated that the I/O components 1102 may include many other components that are not shown in FIG. 11. In various examples, the I/O components 1102 may include user output components 1126 and user input components 1128. The user output components 1126 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1128 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1102 may include biometric components 1130, motion components 1132, environmental components 1134, or position components 1136, among a wide array of other components. For example, the biometric components 1130 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1132 include acceleration sensor components (e.g., accelerometer), gravitation sensor components, rotation sensor components (e.g., gyroscope).

The environmental components 1134 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1136 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1102 further include communication components 1138 operable to couple the machine 1100 to a network 1122 or devices 1124 via respective coupling or connections. For example, the communication components 1138 may include a network interface Component or another suitable device to interface with the network 1122. In further examples, the communication components 1138 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1124 may be another machine or any of a wide variety of peripheral devices (e.g., a peripheral device coupled via a USB).

Moreover, the communication components 1138 may detect identifiers or include components operable to detect identifiers. For example, the communication components 1138 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1138, such as location via Internet Protocol (IP) geolocation, location via Wi-Fi® signal triangulation, location via detecting an NFC beacon signal that may indicate a particular location, and so forth.

The various memories (e.g., main memory 1114, static memory 1116, and memory of the processors 1104) and storage unit 1118 may store one or more sets of instructions and data structures (e.g., software) embodying or used by any one or more of the methodologies or functions described herein. These instructions (e.g., the instructions 1110), when executed by processors 1104, cause various operations to implement the disclosed examples.

The instructions 1110 may be transmitted or received over the network 1122, using a transmission medium, via a network interface device (e.g., a network interface component included in the communication components 1138) and using any one of several well-known transfer protocols (e.g., hypertext transfer protocol (HTTP)). Similarly, the instructions 1110 may be transmitted or received using a transmission medium via a coupling (e.g., a peer-to-peer coupling) to the devices 1124.

Figure 12:
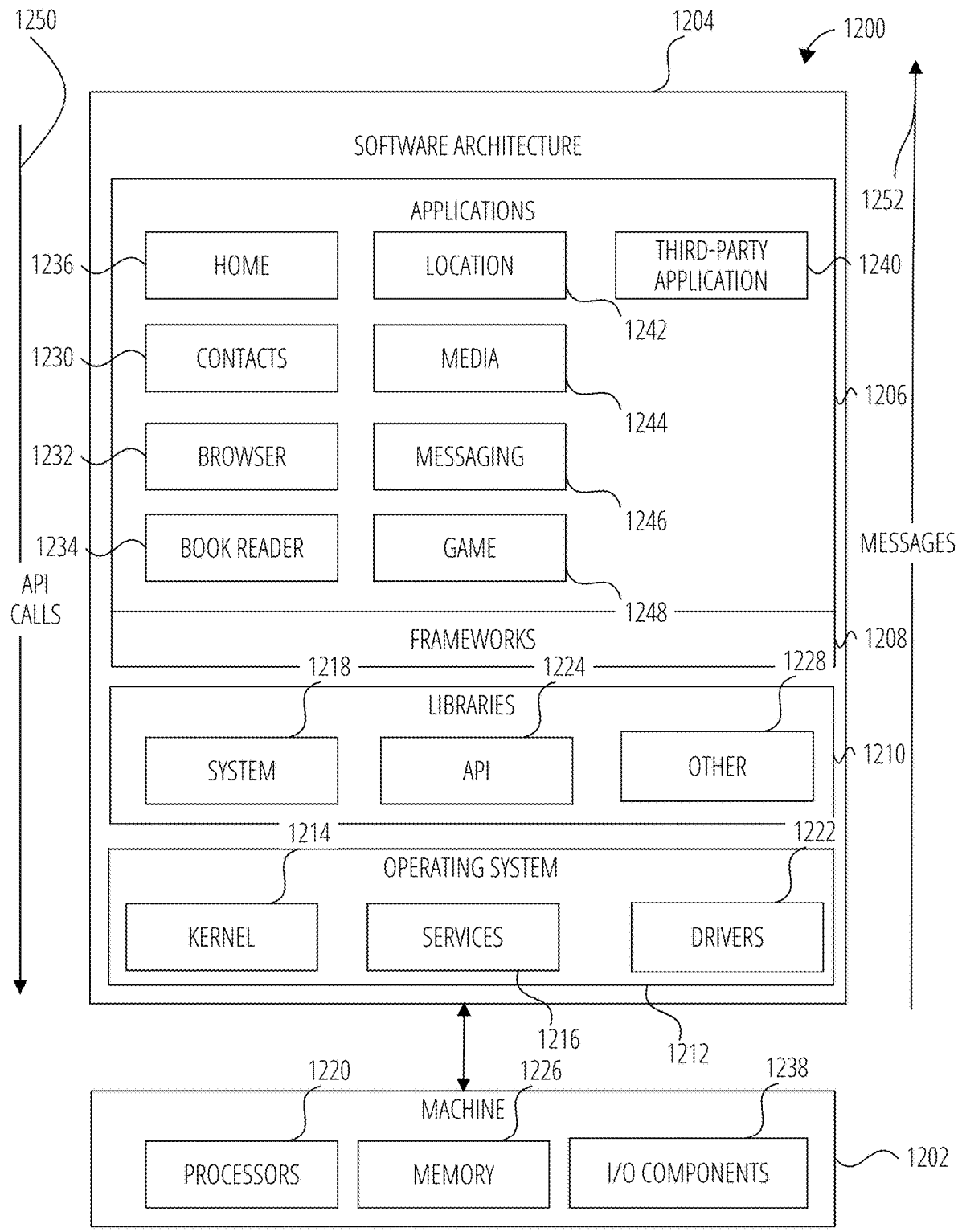
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library)

that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method, comprising:
providing an interface for designing a hybrid event for conferencing between in-person participants and virtual participants, the interface for setting first properties of a physical space device present in a physical space of the in-person participants, the interface further for setting second properties of a virtual room displayable on respective client devices of the virtual participants;

receiving, via the interface, an indication of first user input for setting the first properties and the second properties; and in association with conferencing for the hybrid event, configuring the physical space device based on the first properties as set by the first user input, providing for display of the virtual room based on the second properties as set by the first user input, the virtual room including a live video feed associated with the physical space, the virtual room being accessible by the virtual participants, receiving, via a sidecar application accessible by the in-person participants, an indication of second user input for interacting with the physical space device, the sidecar application being a companion application that is separate from the virtual room accessible by the virtual participants, and providing for interaction with the physical space device based on the second user input, wherein the sidecar application is accessible to the in-person participants via a QR code printed within the physical space, the QR code directing to a link that corresponds to the sidecar application.

2. The method of claim 1, wherein the physical space device comprises a monitor or projector, and wherein the second user input corresponds to user-submitted text for presenting on the monitor or projector and on the respective client devices of the virtual participants.

3. The method of claim 1, wherein the physical space device comprises a monitor or projector, and wherein the second user input corresponds to a user-submitted reaction for presenting on the monitor or projector and on the respective client devices of the virtual participants.

4. The method of claim 1, wherein the physical space device comprises a loudspeaker, and wherein the second user input corresponds to a user-submitted reaction with an audio component for outputting via the loudspeaker and via the respective client devices of the virtual participants.

5. The method of claim 1, wherein the first user input is provided by a designer of the hybrid event, and wherein the second user input is received from at least one client device of the in-person participants, the at least one client device running the sidecar application.

6. The method of claim 1, further comprising:

providing, on a monitor or projector in the physical space, for rotating display of live video feeds captured by the respective client devices.

7. A system comprising:

a processor; and a memory storing instructions that, when executed by the processor, configure the processor to perform operations comprising:

providing an interface for designing a hybrid event for conferencing between in-person participants and virtual participants, the interface for setting first properties of a physical space device present in a physical space of the in-person participants, the interface further for setting second properties of a virtual room displayable on respective client devices of the virtual participants;

receiving, via the interface, an indication of first user input for setting the first properties and the second properties; and in association with conferencing for the hybrid event, configuring the physical space device based on the first properties as set by the first user input, providing for display of the virtual room based on the second properties as set by the first user input, the virtual room including a live video feed associated with the physical space, the virtual room being accessible by the virtual participants, receiving, via a sidecar application accessible by the in-person participants, an indication of second user input for interacting with the physical space device, the sidecar application being a companion application that is separate from the virtual room accessible by the virtual participants, and providing for interaction with the physical space device based on the second user input, wherein the sidecar application is accessible to the in-person participants via a QR code printed within the physical space, the QR code directing to a link that corresponds to the sidecar application.

8. The system of claim 7, wherein the physical space device comprises a monitor or projector, and wherein the second user input corresponds to user-submitted text for presenting on the monitor or projector and on the respective client devices of the virtual participants.

9. The system of claim 7, wherein the physical space device comprises a monitor or projector, and wherein the second user input corresponds to a user-submitted reaction for presenting on the monitor or projector and on the respective client devices of the virtual participants.

10. The system of claim 7, wherein the physical space device comprises a loudspeaker, and wherein the second user input corresponds to a user-submitted reaction with an audio component for outputting via the loudspeaker and via the respective client devices of the virtual participants.

11. The system of claim 7, wherein the first user input is provided by a designer of the hybrid event, and wherein the second user input is received from at least one client device of the in-person participants, the at least one client device running the sidecar application.

12. The system of claim 7, the operations further comprising:

providing, on a monitor or projector in the physical space, for rotating display of live video feeds captured by the respective client devices.

13. A non-transitory computer-readable storage medium, the computer-readable storage medium including instructions that when executed by a computer, cause the computer to perform operations comprising:

providing an interface for designing a hybrid event for conferencing between in-person participants and virtual participants, the interface for setting first properties of a physical space device present in a physical space of the in-person participants, the interface further for setting second properties of a virtual room displayable on respective client devices of the virtual participants;

receiving, via the interface, an indication of first user input for setting the first properties and the second properties; and in association with conferencing for the hybrid event, configuring the physical space device based on the first properties as set by the first user input, providing for display of the virtual room based on the second properties as set by the first user input, the virtual room including a live video feed associated with the physical space, the virtual room being accessible by the virtual participants, receiving, via a sidecar application accessible by the in-person participants, an indication of second user input for interacting with the physical space device, the sidecar application being a companion application that is separate from the virtual room accessible by the virtual participants, and providing for interaction with the physical space device based on the second user input, wherein the sidecar application is accessible to the in-person participants via a QR code printed within the physical space, the QR code directing to a link that corresponds to the sidecar application.

14. The computer-readable medium of claim 13, wherein the physical space device comprises a monitor or projector, and wherein the second user input corresponds to user-submitted text for presenting on the monitor or projector and on the respective client devices of the virtual participants.

15. The computer-readable medium of claim 13, wherein the physical space device comprises a monitor or projector, and wherein the second user input corresponds to a user-submitted reaction for presenting on the monitor or projector and on the respective client devices of the virtual participants.

16. The computer-readable medium of claim 13, wherein the physical space device comprises a loudspeaker, and wherein the second user input corresponds to a user-submitted reaction with an audio component for outputting via the loudspeaker and via the respective client devices of the virtual participants.

17. The computer-readable medium of claim 13, wherein the first user input is provided by a designer of the hybrid event, and wherein the second user input is received from at least one client device of the in-person participants, the at least one client device running the sidecar application.

18. The computer-readable medium of claim 13, the operations further comprising:

providing, on a monitor or projector in the physical space, for rotating display of live video feeds captured by the respective client devices.

\* \* \* \* \*